US010254192B2

(12) United States Patent
Wang et al.

(10) Patent No.: US 10,254,192 B2
(45) Date of Patent: Apr. 9, 2019

(54) COMBINATION TEST METHOD BY USING ARGON AS GROSS-LEAK TEST TRACER GAS AND USING HELIUM AS FINE-LEAK TEST TRACER GAS

(71) Applicants: Genglin Wang, Beijing (CN); Ningbo Li, Beijing (CN); Lijun Dong, Beijing (CN)

(72) Inventors: Genglin Wang, Beijing (CN); Ningbo Li, Beijing (CN); Lijun Dong, Beijing (CN)

( * ) Notice: Subject to any disclaimer, the term of this patent is extended or adjusted under 35 U.S.C. 154(b) by 525 days.

(21) Appl. No.: 14/971,623

(22) Filed: Dec. 16, 2015

(65) Prior Publication Data

US 2016/0313207 A1    Oct. 27, 2016

(30) Foreign Application Priority Data

Apr. 23, 2015  (CN) .......................... 2015 1 0199700

(51) Int. Cl.
    *G01M 3/20* (2006.01)
(52) U.S. Cl.
    CPC ...................... *G01M 3/20* (2013.01)
(58) Field of Classification Search
    CPC ........................................................ G01M 3/20
    See application file for complete search history.

(56) References Cited

U.S. PATENT DOCUMENTS

2004/0154379 A1   8/2004  Enquist et al.
2015/0073726 A1   3/2015  Wang et al.

FOREIGN PATENT DOCUMENTS

| CN | 103471781 A  |   | 12/2013 |
|----|--------------|---|---------|
| CN | 103542988    | * | 1/2014  |
| CN | 103542988 A  |   | 1/2014  |
| EP | 668492 A2    |   | 8/1995  |
| JP | 1301138 A    |   | 12/1989 |
| JP | 2004527743 A |   | 9/2004  |

* cited by examiner

*Primary Examiner* — Mohamed Charioui
*Assistant Examiner* — Catherine T. Rastovski
(74) *Attorney, Agent, or Firm* — Christopher J. Knors; Moore & Van Allen PLLC

(57) ABSTRACT

The present invention discloses an improved method of combination test by using argon as gross-leak tracer gas and using helium as fine-leak tracer gas, belongs to the field of hermeticity test. The method is designed to solve the problem that the existing methods are not ideal when the component has lower $\tau_{Hemin}$ and wider range of volume V. The invention comprises step S1 of selecting: using helium-argon prefilling method for the first hermeticity test and helium-argon pressuring method after helium-argon prefilling for repetitive hermeticity test, or using helium-argon pressuring method after argon prefilling for the first hermeticity test and helium-argon multi-pressuring method after argon prefilling for repetitive hermeticity tests. The improved method extends the maximum detection-waiting time, effectively prevents detection missing and misjudges in gross-leak/fine-leak test, and solves the detection problems on applicability, feasibility and credibility.

2 Claims, 1 Drawing Sheet

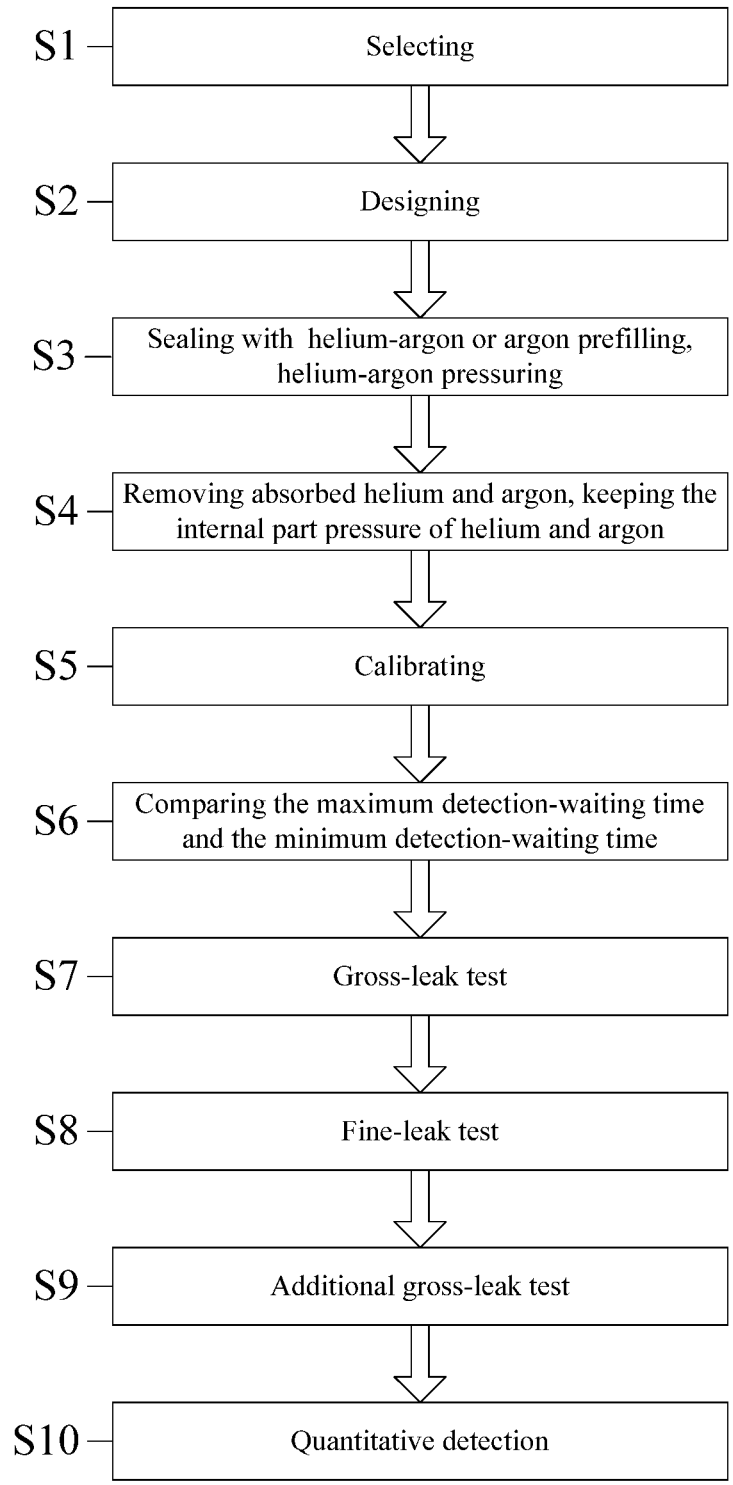

COMBINATION TEST METHOD BY USING ARGON AS GROSS-LEAK TEST TRACER GAS AND USING HELIUM AS FINE-LEAK TEST TRACER GAS

CROSS REFERENCE TO RELATED APPLICATION

This application claims priority from Chinese Patent Application No. 201510199700.2, filed on Apr. 23, 2015, which is hereby incorporated by reference in its entirety.

TECHNICAL FIELD

The present disclosure relates to the field of a hermeticity test method, particularly to a combination test method by using argon as gross-leak test tracer gas and using helium as fine-leak test tracer gas.

BACKGROUND

The cumulative helium mass spectrometric combination leak test method, which uses helium as both gross-leak test tracer gas and fine-leak test tracer gas, is a hermeticity test method, but it is defective for its high detection missing rate and is questioned in credibility. Thus, an improved combination test method is proposed by using the argon as gross-leak test tracer gas.

This improved cumulative helium mass spectrometric combination test method, which is related the US Patent Application Publication No. US2015/0073726 A1, included using argon as gross-leak test tracer gas and using helium as fine-leak test tracer gas, in addition to a number of other improvements. The Patent Application effectively extended the range of applicable rigor grade $\tau_{Hemin}$ and a cavity volume V for the components under detection, and improved the credibility of detection.

The improved combination test method is still not ideal in the detectable range of the cavity volume V when the components under detection have lower rigor grade $\tau_{Hemin}$. And there is still a certain detection missing rate of fine/gross-leak test, the credibility needs further improved.

SUMMARY

An embodiment of the present disclosure provides a combination test method by using argon as gross-leak test tracer gas and using helium as fine-leak test tracer gas, which is to further improve the existing improved helium mass spectrometric combination test method, further extend the applicable range of rigor grade $\tau_{Hemin}$ and cavity volume V, and improve the feasibility and credibility.

For this purpose, the present invention employs the following technical solutions.

The combination test method comprising the following steps: Step S1 of selecting. The helium-argon prefilling method is selected for the first hermeticity test, and the helium-argon pressuring method after helium-argon prefilling is selected for repetitive hermeticity test; the helium-argon pressuring method after argon prefilling is selected for the first hermeticity test, and helium-argon multi-pressuring method after argon prefilling is selected for repetitive hermeticity test; the measured argon leak rate $R_{ArOmax}$ is the criterion for gross-leak test, and the rigor grade $\tau_{Hemin}$ is the basic criterion for fine-leak test and the helium measured leak rate $R_{max}$ is the characteristic criterion; both the fixed scheme and the flexible scheme are selected for the first test, and the flexible scheme is selected for repetitive tests; for the fixed scheme, the rigor grade $\tau_{Hemin}$ is selected as the value of 2000 days, 200 days, or 20 days, and the argon measured leak rate criterion $R_{ArOmax}$ is selected as the value of 7.95× $10^{-4}$ Pa·cm³/s, 2.39×$10^{-3}$ Pa·cm³/s, 7.95×$10^{-3}$ Pa·cm³/s or 2.39×$10^{-2}$ Pa·cm³/s; the rigor grade and criterion for the flexible scheme are selected the same value as those for the fixed scheme, or other values.

In particular, in step S2, the parameters are designed according to the specific method, scheme, $\tau_{Hemin}$ and $R_{ArOmax}$ selected in step S1. the pressure and time conditions of helium-argon prefilling, argon prefilling, or helium-argon pressuring are designed in step S2.1; the helium measured leak rate criterion of fine-leak test $R_{max}$ is designed in step S2.2 and the maximum detection-waiting time $t_{max}$ is designed in step S2.4; the maximum gross-leak detection time $t_{4max}$, the maximum fine-leak detection time $t_{5max}$, and the minimum detection-waiting time $t_{3min}$ of helium-argon prefilling method are designed in step S2.5; and the fixed scheme or the flexible scheme is designed in step S2.6.

In step S2.1, the pressure and time conditions of helium-argon prefilling, argon prefilling or helium-argon pressuring are designed:

if the first detection chooses helium-argon prefilling method, the total gas pressure P is (1+10%)$P_0$ during seal, with helium part pressure $P_{He}$ of (1+10%)$kP_0$, argon partial pressure $P_{Ar}$ of (1+10%) $P_{Ar0}$, and nitrogen of the rest, where $P_0$ is standard atmospheric pressure 1.013×$10^5$ Pa; k is the helium prefilling ratio $P_{Hed}/P_0$, wherein $P_{Hed}$ is a helium partial pressure of a designed helium-argon prefilling when the total pre-inflation pressure is standard atmospheric pressure; and $P_{Ar0}$ is the normal partial pressure of argon in atmosphere, $P_{Ar0}$=946 Pa;

for the fixed scheme, k=0.21 is chosen; and k is variable from 0.03 to 0.5 for flexible scheme;

if helium-argon pressuring method after argon prefilling is selected for the first detection, the total gas pressure P will be (1+10%)$P_0$ during seal, with argon partial pressure (1+10%) $P_{Ar0}$ and the rest of nitrogen; the total pressure of bombed gas is no more than 6$P_0$, in which there is argon with the partial pressure $P_{Ar}$ equal to $P_{Ar0}$, and helium with the partial pressure $P_E$ no less than 2$P_0$. The helium-argon pressuring time $t_1$ is long enough to make sure that the helium measured leak rate criterion $R_{1max}$ reaches the detectable range of detectors;

for the repetitive tests, if the helium-argon pressuring method after helium-argon prefilling is selected, in the nth (integers n is no less than 1) helium-argon pressuring, the argon partial pressure $P_{Ar}$ is $P_{Ar0}$, the helium partial pressure $P_{En}$ is no less than 2$P_0$ to prevent the fine-leak detection missing; the helium-argon pressuring time tin can be obtained by formula (1), $$t_{1n} \geq \frac{1}{P_{En}}\left(\frac{1}{10e}kP_0 t_{3,0n} + 0.15\sum_{i=1}^{n-1} P_{Ei} t_{1i}\right) \quad (1)$$
$$t_{1n} \geq 1.2h$$

where, $t_{3,0n}$ is the interval time from the ending of sealing to the ending of the nth helium-argon pressuring; $P_{Ei}$ and $t_{1i}$ are the helium partial pressure and time in the ith helium-argon pressuring; and for the repetitive tests, if the helium-argon multi-pressuring method after argon prefilling is selected, in the nth (n is no less than 2) helium-argon pressuring, the argon partial pressure $P_{Ar}$ is $P_{Ar0}$, and the helium partial pressure $P_{En}$ is no less than $2P_0$ to prevent the fine-leak detection missing; the helium-argon pressuring time tin can be obtained by formula (1) when k=0.

In step S2.2, the helium measured leak rate criterion $R_{max}$ for fine-leak test is designed:

for the helium-argon prefilling method in first test, the components under detection are stored for the detection-waiting time $t_3$ in the normal atmosphere, the helium measured leak rate criterion $R_{2max}$ of the fine-leak test can be obtained by formula (2), $$R_{2\,max} = \frac{VkP_0}{\tau_{He\,min}} \exp\left(-\frac{t_3}{\tau_{He\,min}}\right) \qquad (2)$$

where, V denotes a cavity volume of the component under detection;

$R_{2max}$ can be obtained by approximate formula (3) in the condition of $$t_3 \leq \frac{1}{10}\tau_{He\,min},$$

$$R_{2\,max} = \frac{VkP_0}{\tau_{He\,min}} \qquad (3)$$

for the helium-argon pressuring method after argon prefilling in the first test, the components under detection are stored in air after seal, bombed helium-argon for time $t_1$ and then stored for detection-waiting time $t_2$, the helium measured leak rate criterion $R_{2max}$ of the fine-leak test can be obtained by formula (4), $$R_{1max} = \frac{VP_E}{\tau_{He\,min}}\left[1 - \exp\left(-\frac{t_1}{\tau_{He\,min}}\right)\right]\exp\left(-\frac{t_2}{\tau_{He\,min}}\right) \qquad (4)$$

or $R_{1max}$ is obtained by approximate formula (5) in the condition of $$t_1 \leq \frac{1}{5}\tau_{He\,min} \text{ and } t_2 \leq \frac{1}{10}\tau_{He\,min}.$$

$$R_{1max} = \frac{VP_E t_1}{\tau_{He\,min}^2} \qquad (5)$$

for the helium-argon pressuring method after helium-argon prefilling in the repetitive tests, the helium measured leak rate criterion $R_{2n.max}$ of fine-leak test after the nth (n is no less than 1) helium-argon pressuring can be obtained by formula (6), $$R_{2n.max} = \frac{V}{\tau_{He\,min}} \qquad (6)$$

$$\left\{kP_0\exp\left(-\frac{t_{3.0n}}{\tau_{He\,min}}\right) + \sum_{i=1}^{n} P_{Ei}\left[1 - \exp\left(-\frac{t_{1i}}{\tau_{He\,min}}\right)\right]\exp\left(-\frac{t_{2.in}}{\tau_{He\,min}}\right)\right\}$$

$$\exp\left(-\frac{t_{2n}}{\tau_{He\,min}}\right)$$

where, $t_{2.in}$ is the interval time from the ending of the ith helium-argon pressuring to the ending of nth helium-argon pressuring; and $t_{2n}$ is the detection-waiting time in normal air after the nth helium-argon pressuring.

Similarly, $R_{2n.max}$ can be obtained by approximate formula (7) in the condition of $$t_{1i} \leq \frac{1}{5}\tau_{He\,min}, t_{2n} \leq \frac{1}{10}\tau_{He\,min},$$

$$R_{2n.max} = \qquad (7)$$

$$\frac{V}{\tau_{He\,min}}\left\{kP_0\exp\left(-\frac{t_{3.0n}}{\tau_{He\,min}}\right) + \frac{1}{\tau_{He\,min}}\sum_{i=1}^{n} P_{Ei}t_{1i}\exp\left(-\frac{t_{2.in}}{\tau_{He\,min}}\right)\right\}$$

for the repetitive tests, in the condition of $$t_{3.0n} \leq \frac{1}{10}\tau_{He\,min} \text{ and } t_{2n} \leq \frac{1}{10}\tau_{He\,min},$$

$R_{2n.max}$ can also be obtained by approximate formula (8), $$R_{2n.max} = \frac{V}{\tau_{He\,min}}\left(kP_0 + \frac{1}{\tau_{He\,min}}\sum_{i=1}^{n} P_{Ei}t_{1i}\right) \qquad (8)$$

furthermore, when $$\left(\frac{1}{\tau_{He\,min}}\sum_{i=1}^{n} P_{Ei}t_{1i}\right) \leq \frac{1}{10}kP_0$$

in the formula (8), $R_{2n.max}$ can be obtained by formula (9), $$R_{2n.max} = \frac{VkP_0}{\tau_{He\,min}} \qquad (9)$$

for the helium-argon multi-pressuring method after argon prefilling in the repetitive tests, the helium measured leak rate criterion $R_{1n.max}$ of fine-leak test after the nth (n is no less than 2) helium-argon pressuring can be obtained by formula (10), $$R_{1n.max} = \qquad (10)$$

$$\frac{V}{\tau_{He\,min}}\left\{\sum_{i=1}^{n} P_{Ei}\left[1 - \exp\left(-\frac{t_{1i}}{\tau_{He\,min}}\right)\right]\exp\left(-\frac{t_{2.in}}{\tau_{He\,min}}\right)\right\}\exp\left(-\frac{t_{2n}}{\tau_{He\,min}}\right)$$

or, $R_{1n.max}$ can be obtained by approximate formula (11) in the condition of $$t_{1i} \leq \frac{1}{5}\tau_{He\,min},\ t_{2n} \leq \frac{1}{10}\tau_{He\,min},$$

$$R_{1n.max} = \frac{V}{\tau_{He\,min}^2}\left[\sum_{i=1}^{n} P_{Ei}t_{1i}\exp\left(-\frac{t_{2.in}}{\tau_{He\,min}}\right)\right] \quad (11)$$

furthermore, when $$t_{2.in} \leq \frac{1}{10}\tau_{He\,min} \text{ and } t_{1i} \leq \frac{1}{10}\tau_{He\,min}$$

in formula (11), $R_{1n.max}$ can be obtained by formula (12), $$R_{1n.max} = \frac{V}{\tau_{He\,min}^2}\sum_{i=1}^{n} P_{Ei}t_{1i} \quad (12)$$

in step S2.3, the upper limit of the cavity volume can be obtained by formula (13), $$V_{max} = \frac{L_{max0}\tau_{He\,min}}{P_0}\sqrt{\frac{M_A}{M_{He}}} \quad (13)$$

where, $L_{max0}$ is the maximum detectable equivalent standard leak rate, $L_{max}$=1.0 Pa·cm³/s; $M_{He}$ is the molecular weight of helium in grams, $M_{He}$=4.003 g; and $M_A$ is the average molecular weight of air in grams, $M_A$=28.96 g.

In step S2.4, the maximum detection-waiting time $t_{max}$ of fine-leak test is designed:

corresponding to the argon measured leak rate criterion $R_{Ar0max}$ of gross-leak rate test $R_{0max}$, which is the helium measured leak rate criterion of gross-leak rate test when the helium partial pressure $P_{He}$ is equal to $P_{He0}$ in the component under test, can be obtained by formula (14), $$R_{0\,max} = R_{Ar0\,max}\frac{P_{He0}}{P_{Ar0}}\sqrt{\frac{M_{Ar}}{M_{He}}} \quad (14)$$

where, $P_{He0}$ is the helium partial pressure in normal atmosphere, $P_{He0}$=0.533 Pa; $M_{Ar}$ is the molecular weight of argon in grams, $M_{Ar}$=39.948 g;

the helium exchange time constant $\tau_{He0}$ of gross-leak can be obtained by formula (15), $$\tau_{He0} = \frac{VP_0}{L_0}\sqrt{\frac{M_{He}}{M_A}} = \frac{VP_{He0}}{R_{0\,max}} = \frac{VP_{Ar0}}{R_{Ar0max}}\sqrt{\frac{M_{He}}{M_{Ar}}} \quad (15)$$

where, $L_0$ is the minimum detectable equivalent standard leak rate for gross-leak test, $$L_0 = R_{Ar0\,max}\frac{P_0}{P_{Ar0}}\sqrt{\frac{M_{Ar}}{M_A}};$$

the argon exchange time constant $\tau_{Ar0}$ of gross-leak can be obtained by formula (16), $$\tau_{Ar0} = \frac{VP_{Ar0}}{R_{Ar0max}} = \tau_{He0}\sqrt{\frac{M_{Ar}}{M_{He}}} \quad (16)$$

the helium exchange time constant $\tau_{He0.m}$ of medium-leak can be obtained by formula (17), $$\tau_{He0.m} = \tau_{He0}\frac{R_{0max}}{R_{max}} \quad (17)$$

where, the fine-leak helium measured leak rate criterion $R_{max}$ is less than $R_{0max}$;

for helium-argon prefilling method, when $\tau_{Hemin} > \tau_{He0}$ and $R_{2max} \geq R_{0max}$, the maximum detection-waiting time of fine-leak test or combination test $t_{3max}$ can be obtained by formula (18), $$t_{3max} = \quad (18)$$
$$\frac{\tau_{Hemin}\tau_{He0}}{\tau_{Hemin} - \tau_{He0}}\ln\left(\frac{\tau_{Hemin}}{\tau_{He0}}\right) = \frac{\tau_{Hemin}VP_{He0}}{\tau_{Hemin}R_{0max} - VP_{He0}}\ln\left(\frac{\tau_{Hemin}R_{0max}}{VP_{He0}}\right)$$

for the fixed scheme, $t_{3max}$ can be obtained by formula (19), $$t_{3max} = \frac{\tau_{Hemin}VP_{He0}}{\tau_{Hemin}R_{0max} - VP_{He0}}\ln\left(\frac{\tau_{Hemin}R_{0max}}{VP_{He0}}\right) \quad (19)$$
$$t_{3max} \leq \frac{1}{10}\tau_{Hemin}$$

for the helium-argon prefilling method, when $\tau_{Hemin} > \tau_{He0}$ and $R_{2max} < R_{0max}$, $t_{3max}$ can be obtained by formula (20), $$t_{3max} = \frac{\tau_{Hemin}\tau_{He0.m}}{\tau_{Hemin} - \tau_{He0.m}}\ln\left(\frac{\tau_{Hemin}}{\tau_{He0.m}}\right) \quad (20)$$

for the fixed scheme, $t_{3max}$ can be obtained by formula (21), $$t_{3max} = \frac{\tau_{Hemin}P_{He0}}{kP_0 - P_{He0}}\ln\left(\frac{kP_0}{P_{He0}}\right) \quad (21)$$
$$t_{3max} \leq \frac{1}{10}\tau_{Hemin}$$

for the helium-argon pressuring method after argon prefilling, when $\tau_{Hemin} > \tau_{He0}$ and $R_{1max} \geq R_{0max}$, the maximum detection-waiting time of fine-leak test $t_{2max}$ can be obtained by formula (22), $$t_{2max} = \frac{\tau_{Hemin}\tau_{He0}}{\tau_{Hemin} - \tau_{He0}}\left\{\ln\left(\frac{\tau_{Hemin}}{\tau_{He0}}\right) + \ln\left[\frac{1 - \exp\left(-\frac{t_1}{\tau_{He0}}\right)}{1 - \exp\left(-\frac{t_1}{\tau_{Hemin}}\right)}\right]\right\} = \quad (22)$$

$$\frac{\tau_{Hemin} VP_{He0}}{\tau_{Hemin} R_{0max} - VP_{He0}} \left\{ \ln\left(\frac{\tau_{Hemin} R_{0max}}{VP_{He0}}\right) + \ln\left[\frac{1 - \exp\left(-\frac{t_1 R_{0max}}{VP_{He0}}\right)}{1 - \exp\left(-\frac{t_1}{\tau_{Hemin}}\right)}\right] \right\}$$

for the fixed scheme, $t_{2max}$ can be obtained by formula (23), $$t_{2max} = \frac{\tau_{Hemin} VP_{He0}}{\tau_{Hemin} R_{0max} - VP_{He0}} \left\{ \ln\left(\frac{\tau_{Hemin} R_{0max}}{VP_{He0}}\right) + \ln\left[\frac{1 - \exp\left(-\frac{t_1 R_{0max}}{VP_{He0}}\right)}{1 - \exp\left(-\frac{t_1}{\tau_{Hemin}}\right)}\right] \right\} \quad (23)$$

$$t_{2max} \leq \frac{1}{10} \tau_{Hemin}$$

for the helium-argon pressuring method after argon pre-filling, when $\tau_{Hemin} > \tau_{He0}$, $R_{1max} < R_{0max}$, $t_{2max}$ can be obtained by formula (24), $$t_{2max} = \frac{\tau_{Hemin} \tau_{He0.m}}{\tau_{Hemin} - \tau_{He0.m}} \left\{ \ln\left(\frac{\tau_{Hemin}}{\tau_{He0.m}}\right) + \ln\left[\frac{1 - \exp\left(-\frac{t_1}{\tau_{He0.m}}\right)}{1 - \exp\left(-\frac{t_1}{\tau_{Hemin}}\right)}\right] \right\} \quad (24)$$

for the fixed scheme, $t_{2max}$ can be obtained by formula (25), $$t_{2max} = \frac{\tau_{Hemin}^2 P_{He0}}{P_E t_1 - P_{He0} \tau_{Hemin}} \left\{ \ln\left(\frac{P_E t_1}{P_{He0} \tau_{Hemin}}\right) + \ln\left[\frac{1 - \exp\left(-\frac{P_E t_1}{P_{He0} \tau_{Hemin}^2}\right)}{1 - \exp\left(-\frac{t_1}{\tau_{Hemin}}\right)}\right] \right\} \quad (25)$$

$$t_{2max} \leq \frac{1}{10} \tau_{Hemin}$$

for the helium-argon pressuring method after argon pre-filling, after the nth (n is no less than 1) helium-argon pressuring, the maximum detection-waiting time can be obtained by formula (26), when $\tau_{Hemin} > \tau_{He0}$ and $R_{2n.max} \geq R_{0max}$, $$t_{3n.max} = \frac{\tau_{Hemin} \tau_{He0}}{\tau_{Hemin} - \tau_{He0}} \ln\left(\frac{\tau_{Hemin}}{\tau_{He0}}\right) \quad (26)$$

in the condition of $\tau_{Hemin} > \tau_{He0}$ and $R_{2n.max} < R_{0max}$, $t_{3n.max}$ can be obtained by formula (27), $$t_{3n.max} = \frac{\tau_{Hemin} \tau_{He0.m}}{\tau_{Hemin} - \tau_{He0.m}} \ln\left(\frac{\tau_{Hemin}}{\tau_{He0.m}}\right) \quad (27)$$

for the helium-argon pressuring method after argon pre-filling, after the nth (n is no less than 2) helium-argon pressuring, the maximum detection-waiting time of fine-leak $t_{2n.max}$ can be obtained by formula (28), when $\tau_{Hemin} > \tau_{He0}$ and $R_{1n.max} \geq R_{0max}$, $$t_{2n.max} = \frac{\tau_{Hemin} \tau_{He0}}{\tau_{Hemin} - \tau_{He0}} \ln\left(\frac{\tau_{Hemin}}{\tau_{He0}}\right) \quad (28)$$

in the condition of $\tau_{Hemin} > \tau_{He0}$ and $R_{1n.max} < R_{0max}$, $t_{2n.max}$ can be obtained by formula (29), $$t_{2n.max} = \frac{\tau_{Hemin} \tau_{He0.m}}{\tau_{Hemin} - \tau_{He0.m}} \ln\left(\frac{\tau_{Hemin}}{\tau_{He0.m}}\right) \quad (29)$$

all the $t_{max}$ (including $t_{3max}$, $t_{2max}$, $t_{3n.max}$, $t_{2n.max}$) are no less than 0.5 hours.

In step S2.5, in order to reduce or prevent detection missing in gross-leak test and fine-leak test, the parameters, including the maximum gross-leak detection time $t_{4max}$, fine-leak detection time $t_{5max}$ and the minimum detection-waiting time of helium-argon prefilling method $t_{3min}$, are designed:

$t_{4max}$ can be obtained by formula (30) when using one of the four typical hermeticity test methods (including helium-argon prefilling method, helium-argon pressuring method after argon prefilling, helium-argon pressuring method after helium-argon prefilling, helium-argon multi-pressuring method after argon prefilling), $$t_{4max} = \frac{1}{10} \tau_{Ar0} = \frac{1}{10} \frac{VP_{Ar0}}{R_{Ar0max}} \quad (30)$$

$$30\ s \leq t_{4max} \leq 900\ s$$

for the four typical hermeticity test methods, when the measured leak rate criterion of fine-leak test $R_{max}$ (including $R_{2max}$, $R_{1max}$, $R_{2n.max}$, $R_{1n.max}$) is no less than $0.905 R_{0max}$, $t_{5max}$ can be obtained by formula (31), $$t_{5max} = \frac{1}{10} \tau_{He0} = \frac{1}{10} \frac{VP_0}{L_0} \sqrt{\frac{M_{He}}{M_A}} \quad (31)$$

$$60\ s \leq t_{5max} \leq 1200\ s$$

and for helium-argon prefilling method, $t_{3min}$ can be obtained by formula (31), $$t_{3\,min} = \tau_{He0} \frac{1}{1 + 10 l_{He.n}} \quad (32)$$

$$t_{3\,min} \leq \frac{1}{3} t_{3\,max}$$

or $$t_{3\,min} \leq t_{3\,max} - 24h$$

where, $l_{He.n}$ is the viscous conductance constant corresponding to $L_0$ (Pa·cm³/s), when the pressures of both leak hole ends respectively are $P_0$ and 0, and can be obtained by formula (33), $$l_{He.n} = 0.5 L_0^{0.314} \quad (33)$$

for the four typical hermeticity test methods, when $R_{max}$ is less than $0.905 R_{0max}$, $t_{5max}$ can be obtained by formula (34), $$t_{5\,max} = \frac{VP_{Ar0}}{R_{Ar\,0\,max}} \sqrt{\frac{M_{He}}{M_{Ar}}} \ln\left(\frac{R_{0\,max}}{R_{max}}\right) \quad (34)$$

$$60s \leq t_{5max} \leq 1200s$$

In step S2.6, the fixed scheme or flexible scheme is designed:

according to a cavity volume V, the selected $\tau_{Hemin}$ and $R_{Ar0max}$, the flexible scheme can be designed for the combination test with argon as gross-leak tracer gas and helium as fine-leak tracer gas.

for the components under detection with acceptable hermeticity rigor grade $\tau_{Hemin}$, the maximum equivalent standard leak rate $L_{max}$ can be obtained by formula (35), $$L_{max} = \frac{VP_0}{\tau_{He\,min}} \sqrt{\frac{M_{He}}{M_A}} \quad (35)$$

the range of cavity volume V, i.e. 0.0006 cm³~200 cm³, is divided into different segments, and then the fixed scheme of the helium-argon prefilling method and helium-argon pressuring method after argon prefilling is designed. In the design, $R_{2max}$ can be obtained by formula (3) and $R_{1max}$ by formula (5); the lower limit of a cavity volume segment will be used when designing $R_{2max}$, $R_{1max}$, $t_{3max}$, $t_{2max}$, $t_{4max}$, $t_{5max}$ and $L_{max}$; similarly, the upper limit of V will be used when designing $t_{3min}$.

In particular, in step S3, helium-argon or argon is prefilled during sealing and helium-argon is pressured:

for the helium-argon prefilling method and helium-argon pressuring method after argon prefilling, the total pressure of prefilling gas P is $(1+10\%)P_0$ with the argon partial pressure of $(1+10\%)946$ Pa and the helium part pressure as follows: for helium-argon prefilling method, the helium pressure ratio k will be 21% in fixed scheme, or designed by step S2 in flexible scheme. There is no helium in the prefilling gas for helium-argon pressuring method after argon prefilling; and for the fixed scheme and flexible scheme of helium-argon pressuring method after helium-argon prefilling, the flexible scheme of helium-argon pressuring method after argon prefilling and helium-argon multi-pressuring method after argon prefilling, the argon pressure in helium-argon pressuring gas is $(1+10\%)946$ Pa, and helium pressures $P_E$, $P_{En}$ is no less than $2P_0$.

In particular, in step S4, removing the absorbed helium-argon and keeping internal $P_{Ar0}$ and $P_{He0}$ are designed as follows:

in order to prevent detection missing or misjudge in gross-leak test, the component after sealing or helium-argon pressuring should be kept in normal dry air environment with normal argon and helium pressure; and to prevent the detection missing in fine-leak/gross-leak test, the components is stored in normal air for $3.23\Delta t$ at least to make the argon partial pressure get back to no less than $0.9\,P_{Ar0}$ and the helium partial pressure no less than $0.9P_{He0}$ if they experienced vacuum baking or testing in the environment without normal helium and argon for $\Delta t$ ($\Delta t$ is no longer than $\frac{1}{6}t_{max}$); the argon leak rate criterion change into $0.9R_{Ar0max}$ for gross-leak test. and the helium leak rate criterion is still $R_{max}$ for fine-leak test.

In particular, in step S6, the maximum and minimum detection-waiting time of fine-leak test are compared:

for helium-argon prefilling method, the fine-leak test detection-waiting time $t_3$ (between the ending of seal and the beginning of fine-leak test), is no longer than $t_{3max}$ designed in step S2.4; when the fine-leak measured leak rate $R_{2max} \geq 0.905R_{0max}$, $t_3$ should be no less than $t_{3min}$ designed in step S2.5; and for the helium-argon pressuring method after argon prefilling, the helium pressuring method after helium-argon prefilling and helium-argon multi-pressuring method after argon prefilling, the maximum detection-waiting time from the ending of the last helium-argon pressuring to the beginning of the combination test $t_2$, $t_{3n}$ and $t_{2n}$ is no more than $t_{2max}$, $t_{3max}$, $t_{2n.max}$ designed in step S2.4; if $t_3 > t_{3max}$, $t_2 > t_{2max}$, $t_{3n} > t_{3n.max}$ or $t_{2n} > t_{2n.max}$, the components are pressured helium-argon and be removed absorbed helium-argon again before test.

In particular, in step S7, the gross-leak test is designed:

in order to prevent misjudge and reduce the detection missing ratio, the gross-leak detection time $t_4$, which is from putting in the test chamber to beginning to read the argon measured leak rate $R_{Ar}$ of gross-leak, is no less than the minimum gross-leak detection time $t_{4min}$ and no longer than $t_{4max}$ designed in step S2.5; $t_{4min}$ is the longest time for the background argon leak rate reducing to $\frac{1}{3}R_{Ar0max}$ in the condition of stable test system and empty chamber; and if the argon measured leak rate $R_{Ar}$ is no less than $R_{Ar0max}$, the component is refused; else the component is accepted and the fine-leak test can be done next.

In particular, in step S8, the fine-leak test is designed:

in order to prevent misjudge and reduce the detection missing ratio, the fine-leak detection time $t_5$, which is from putting in the test chamber to beginning to read the argon measured leak rate $R_{Ar}$ of fine-leak, is no less than the minimum fine-leak detection time $t_{5min}$ and no longer than $t_{5max}$ designed in step S2.5; $t_{5min}$ is the longest time for the background helium leak rate reducing to $\frac{1}{3}R_{max}$ (including $R_{2max}$, $R_{1max}$, $R_{2n.max}$ and $R_{1n.max}$) in the condition of stable test system and empty chamber; and if the measured helium leak rate R (R can be $R_2$, $R_1$, $R_{2n}$, or $R_{1n}$) is higher than $R_{max}$, the component is refused, else the component is accepted and the further detection is done as described in step S9.

In particular, in step S10, the quantitative detection method is designed:

if the quantitative detection $\tau_{He}$ or L of is required, the specific method of flexible scheme, higher $\tau_{Hemin}$ and available lower $R_{Ar0max}$ is selected in step S1; helium-argon prefilling method or helium-argon pressuring method after argon prefilling can be selected for the first test, then helium-argon pressuring method after helium-argon prefilling or helium-argon multi-pressuring method after argon prefilling can be selected for the repetitive tests.

According to a certain cavity volume V, the flexible scheme is designed in step S2.6; where the ratio k is equal to 0.21 for helium-argon prefilling method, the ith helium-argon pressuring time $t_{1i}$ and the maximum detection-waiting time $t_{max}$ (including $t_{3max}$, $t_{2max}$, $t_{3n.max}$, $t_{2n.max}$) are shorter than $0.1\tau_{Hemin}$. Thus, the helium measured leak rate criterion $R_{max}$ (including $R_{2max}$, $R_{1max}$, $R_{2n.max}$, $R_{1n.max}$) is given, so as to the relative test condition of $P_E$ (or $P_{En}$), $t_{4max}$, $t_{5max}$, $t_{3min}$;

in step S8 of fine-leak test, some sample with the same shape, which has been detected and accepted, should be used to prove the absorbed helium leak rate $R_a < 0.1\,R_{max}$, the background helium measured leak rate $R_b$ should be read when the chamber is empty, and the helium measured leak rate of the component R can be read, which may be $R_2$, $R_1$, $R_{2n}$, $R_{1n}$;

for the accepted component ($\tau_{He} \geq \tau_{Hemin}$), the real helium measured leak rate R' (containing $R_2'$, $R_1'$, $R_{2n}'$, $R_{1n}'$) can be obtained by formula (36), $$R' = R - R_b \quad (36)$$

where, R' contains absorbed helium leak rate and other system deviation, for the accepted component in hermeticity test, the helium gas exchange constant $\tau_{He}$ can be approximately obtained by formula (37) through asymptotic fitting method, $$R_2' = \frac{V}{\tau_{He}}\left[kP_0 \exp\left(-\frac{t_3}{\tau_{He}}\right) + P_{He0}\right] \quad (37)$$

in the condition of $$t_3 \leq \frac{1}{10}\tau_{He\ min}$$

and $kP_0 \geq 10P_{He0}$, the gas exchange constant $\tau_{He}$ can be approximately obtained by formula (38), $$\tau_{He} = \tau_{He\ min}\frac{R_{2\ max}}{R_2'} \quad (38)$$

for the accepted component in hermeticity test by using helium-argon pressuring method after argon prefilling, the gas exchange constant $\tau_{He}$ can be approximately obtained by formula (39) through asymptotic fitting method, $$R_1' = \frac{V}{\tau_{He}}\left\{P_E\left[1 - \exp\left(-\frac{t_1}{\tau_{He}}\right)\right]\exp\left(-\frac{t_2}{\tau_{He}}\right) + P_{He0}\right\} \quad (39)$$

or it can be obtained by formula (40) in the condition of $$t_1 \leq \frac{1}{10}\tau_{He\ min}, t_2 \leq \frac{1}{10}\tau_{He\ min}, P_E t_1/T_{He} \geq 10P_{He0},$$

$$\tau_{He} = \tau_{He\ min}\sqrt{\frac{R_{1max}}{R_1'}} \quad (40)$$

for the accepted component in hermeticity test by using helium-argon pressuring method after helium-argon prefilling, $\tau_{He}$ can be approximately obtained by formula (41) through asymptotic fitting method, $$R_{2n}' = \frac{V}{\tau_{He}}\left\{\left\{kP_0\exp\left(-\frac{t_{3.0n}}{\tau_{He}}\right) + \sum_{i=1}^{n}P_{Ei}\left[1 - \exp\left(-\frac{t_{1i}}{\tau_{He}}\right)\right]\exp\left(-\frac{t_{2.in}}{\tau_{He}}\right)\right\}\exp\left(-\frac{t_{2n}}{\tau_{He}}\right) + P_{He0}\right\} \quad (41)$$

for the accepted component in hermeticity test by using helium-argon multi-pressuring method after argon prefilling, $\tau_{He}$ can be approximately obtained by formula (42) through asymptotic fitting method, $$R_{1n}' = \frac{V}{\tau_{He}}\left\{\sum_{i=1}^{n}P_{Ei}\left[1 - \exp\left(-\frac{t_{1i}}{\tau_{He}}\right)\right]\exp\left(-\frac{t_{2.in}}{\tau_{He}}\right)\exp\left(-\frac{t_{2n}}{\tau_{He}}\right) + P_{He0}\right\} \quad (42)$$

then the equivalent standard leak rate L can be obtained by formula (43) when $\tau_{He}$ has been gotten, $$L = \frac{VP_0}{\tau_{He}}\sqrt{\frac{M_{He}}{M_A}} \quad (43)$$

both of $\tau_{He}$ and L can be the quantitative detection results with certain detection deviation In this invention of the combination test method by using argon as gross-leak tracer gas and using helium as fine-leak tracer gas, helium-argon prefilling method or helium-argon pressuring method after argon prefilling can be selected for the first test, and helium-argon pressuring method after helium-argon prefilling or helium-argon multi-pressuring method after argon prefilling can be selected for the repetitive tests; this invention extends the range of argon measured leak rate criterion $R_{Ar0max}$ for gross-leak test; in order to reduce the leak detection missing rate in fine/gross-leak test and prevent misjudge, this invention extends the maximum detection-waiting time, rules the longest and shortest detection time of fine-leak test and gross-leak test, rules the minimum detection-waiting time for helium-argon prefilling method, and improves the quantitative detection method. In this way, the applicable range of rigor grade $\tau_{Hemin}$ and cavity volume V is further extended, the detection missing of fine/gross-leak test can be fundamentally prevented, and further effectively improved the feasibility and credibility of the detection.

DETAILED DESCRIPTION OF THE EMBODIMENTS

As shown in FIG. 1, the technical solutions of the present invention are further described by detailed description of the embodiments as follows.

1. The Related Terms, Symbols and Definitions

The equivalent standard leak rate L refers to a flow rate of air with a temperature of 25° C.±5° C. and a dew point lower than −25° C. that passes through a leak aperture according to a molecular flow model provided that air is composed of molecules of a single type, where the pressure at an entrance of the leak aperture is 101.3 kPa and the pressure at an exit of the leak aperture is lower than 1 kPa. The equivalent standard leak rate is a virtual equivalent, and also referred to as an air standard leak rate.

The helium standard leak rate $L_{He}$ refers to a flow rate of helium gas with a temperature of 25° C.±5° C. that passes through a leak aperture according to a molecular flow model, where the pressure of the helium gas at an entrance of the leak aperture is standard atmospheric pressure $P_0$, i.e., 101.3 kPa, and the pressure of the helium gas at an exit of the leak aperture is lower than 1 kPa. The standard leak rate of any gas is inversely proportional to the square root of a molecular weight of the gas in grams as follows:

$$L_{He} = \sqrt{\frac{M_A}{M_{He}}} L$$

where, $M_A$ denotes the mean molecular weight of air in grams, $M_A$=28.96 g; and $M_{He}$ denotes the molecular weight of helium gas in grams, $M_{He}$=4.003 g.

The fine-leak test refers to hermeticity test on a sealed component with an equivalent standard leak rate L no larger than 1.0 Pa·cm³/s.

The gross-leak test refers to hermeticity test on a sealed component with an equivalent standard leak rate L no less than 0.1 Pa·cm³/s, 0.3 Pa·cm³/s, 1.0 Pa·cm³/s or 3.0 Pa·cm³/s, which is equivalent with a measured leak rate $R_{Ar0}$ of gross-leak test by using argon as tracer gas no less than 7.95×10⁻³ Pa·cm³/s, 2.39×10⁻³ Pa·cm³/s, 7.95×10⁻³ Pa·cm³/s or 2.39×10⁻³ Pa·cm³/s.

The minimum detectable leak rate $L_0$ for gross-leak test refers to argon measured leak rate criterion $R_{Ar0max}$ for gross-leak test, which ensuring the minimum detectable equivalent standard leak rate.

$$L_0 = R_{Ar\,0\,max} \frac{P_0}{P_{Ar0}} \sqrt{\frac{M_{Ar}}{M_A}}$$

Where, $R_{Ar0max}$ denotes the argon measured leak rate criterion; $P_{Ar0}$ denotes the argon partial pressure in normal air, $P_{Ar0}$=946 Pa; $M_{Ar}$ denotes the molecular weight of argon gas in grams, $M_{Ar}$=39.948 g.

The equivalent helium measured leak rate of gross-leak test $R_{0max}$ refers to $R_{Ar0max}$ to ensure the detectable helium measured leak rate, which can be obtained as follows:

$$R_{0max} = R_{Ar0max} \frac{P_{He0}}{P_{Ar0}} \sqrt{\frac{M_{Ar}}{M_{He}}}$$

Where, $P_{He0}$ is the helium partial pressure in normal air, $P_{He0}$=0.533 Pa.

The helium gas exchange time constant $\tau_{He}$ refers to the time needed when the internal helium gas pressure of a vacuum sealed component in a helium gas environment reaches (1-1/e), i.e., 63.2%, of the environmental helium gas pressure.

$$\tau_{He} = \frac{VP_0}{L_{He}} = \frac{VP_0}{L} \sqrt{\frac{M_{He}}{M_A}}$$

Where, V denotes a cavity volume of a sealed component.

The helium gas exchange time constant $\tau_{He0}$ for gross-leak test refers to the helium gas exchange time constant corresponding to the minimum detectable leak rate $L_0$ of gross-leak test.

$$\tau_{He0} = \frac{VP_0}{L_0} \sqrt{\frac{M_{He}}{M_A}}$$

Where, $L_0$ is the minimum detectable leak rate for gross-leak test.

The argon gas exchange time constant $\tau_{Ar0}$ for gross-leak test refers to the argon gas exchange time constant corresponding to the minimum detectable leak rate $L_0$ of gross-leak test.

$$\tau_{Ar0} = \frac{VP_0}{L_0} \sqrt{\frac{M_{Ar}}{M_A}} = \frac{VP_{Ar0}}{L_{Ar0max}}$$

The helium gas exchange time constant $\tau_{He0.m}$ for medium leak test refers to the helium gas exchange time constant corresponding to the vacuum helium leak rate $R_{max}$ when the helium measured leak rate criterion $R_{max}$ is lower than $R_{0max}$ and the internal helium partial pressure is $P_{He0}$.

$$\tau_{He0.m} = \tau_{He0} \frac{R_{0max}}{R_{max}} s$$

The rigor grade $\tau_{Hemin}$ refers to a constant of the allowable minimum helium gas exchange time for an acceptable component under test.

The helium-argon prefilling method: it refers to a cumulative helium mass spectrometric combination test by using argon as tracer gas for gross-leak test and using helium as tracer gas for fine-leak test, and it is applied in the first leak test of the component under test which has been prefilled nitrogen with specified ratios of helium gas and argon gas before sealing.

The helium-argon pressuring method after argon prefilling refers to a cumulative helium mass spectrometric combination test by using argon as tracer gas for gross-leak test and using helium as tracer gas for fine-leak test, and it is applied in the first leak test of the component under test which has been prefilled nitrogen with specified ratios of argon gas and pressured a certain partial pressure of helium and argon for some time after sealing.

The helium-argon pressuring method after helium-argon prefilling refers to a cumulative helium mass spectrometric combination test by using argon as tracer gas for gross-leak test and using helium as tracer gas for fine-leak test, and it is applied in the repetitive tests of the component under test which has been prefilled nitrogen with specified ratios of helium-argon gas and pressured a certain partial pressure of helium and argon for some time after sealing.

The helium-argon multi-pressuring method after argon prefilling refers to a cumulative helium mass spectrometric combination test by using argon as tracer gas for gross-leak test and using helium as tracer gas for fine-leak test, and it is applied in the repetitive tests of the component under test which has been prefilled nitrogen with specified ratios of argon gas and pressured a certain partial pressure of helium and argon for some time after sealing.

The fixed scheme of helium-argon prefilling method and helium-argon pressuring method after argon prefilling for the first time refers to a test scheme that ruling the parameters according to the selected rigor grade, test method, and argon measured leak rate criterion for gross-leak test. The parameters contains the cavity volume segments, the fixed condition of helium-argon prefilling or helium-argon pressuring after argon prefilling, the helium measured leak rate criterion for fine-leak test, the detection-waiting time, the longest gross-leak detection time and fine-leak detection time. The fixed scheme is convenient and easy to operate but is accompanied with a certain test deviation.

The flexible scheme of helium-argon prefilling method and helium-argon pressuring method after argon prefilling for the initial test or helium-argon pressuring method after helium-argon prefilling and helium-argon multi-pressuring method after argon prefilling for the repetitive tests: it refers to a test scheme that ruling the parameters according to the selected rigor grade, test method, and argon measured leak rate criterion for gross-leak test. For a certain cavity volume, the parameters contains the fixed ratio of argon when sealing, flexible ratio of helium when helium-argon pressuring, flexible helium measured leak rate criterion for fine-leak test, the maximum and minimum detection-waiting time, the longest gross-leak detection time and fine-leak detection time. The flexible scheme can be used for more accurate test, but involves flexible and specific design and calculation of the test condition and the criterion for measured leak rate.

2. Instruments, Tool Sets and the Component Under Test

The needed test instruments and tool sets for the method of cumulative helium mass spectrometric combination test by using argon as gross-leak tracer gas and using helium as fine-leak tracer gas mainly include: a helium-argon prefilling and sealing device, a helium-argon pressuring tank, a detecting chamber, a standard aperture, a cumulative helium mass spectrometric combination leak detector, etc.

The helium-argon prefilling and sealing device should meet the following requirements that: the pressure of prefilled gas is 1.00~1.10 standard atmospheric pressure $P_0$; the device can be vacuumed to below 10 Pa; the device can be prefilled with a gas mixture of nitrogen, helium and argon, wherein the ratio of the partial pressure of argon gas to the total pressure is 0.934%, the ratio of the partial pressure of helium gas to the total pressure is 21.0% or 3%~50% and the rest is nitrogen. The ratios of argon gas and helium gas are not deviated by more than ±5%; and the component is sealed in the prefilled gas.

The helium-argon pressurizing tank should meet the following requirements of: a sustainable internal pressure with an absolute pressure of the total pressure for helium-argon pressuring and a sustainable external pressure with an absolute pressure of the standard atmospheric pressure; the tank can be vacuumed to below 10 Pa; in the pressured gas, the partial pressure of argon gas $P_{Ar0}$=946 Pa and the partial pressure of helium gas is designed $P_{E,n}$. Neither $P_{E,n}$ nor $P_{Ar0}$ are deviated by more than ±5%; and a pressure drop in 40 hours less than 10% of the initial pressure inside the tank which is the highest pressure of helium pressuring.

The detecting chamber should meet the following requirements that: its effective capacity meeting the leak test requirements shall be as small as possible, and the net volume of the detecting chamber after putting into a component under test is no more than 50 times of the cavity volume V of the component under test; the chamber can be vacuumed to below 5 Pa after being closed; and a standard leak aperture should be able to be put into the chamber or be connected to the chamber in the shortest distance.

The standard leak aperture should meet the following requirements that: the measurable leak rate range that can be calibrated and covered by the nominal value of the leak rate of the helium and argon standard aperture should meet the argon gas gross-leak and helium gas fine-leak test requirements; and the standard leak aperture should be used in the calibration or verification validity period.

During cumulative helium mass spectrometric gross-leak and fine-leak combination test, the cumulative helium mass spectrometric combination leak detector should meet the corresponding standards and the requirements of the present test method. The helium mass spectrometric leak test system which is connected to the detecting chamber should meet the following requirements:

a normal maintenance procedure should be carried out on the leak test system according to a maintenance regime. The detector should work in a clean indoor environment with a temperature of $25_{-5}^{+3}$° C., a relative humidity no more than 50% and without an argon gas and helium gas contamination;

having the function of using argon gas as tracer gas of gross-leak test, the gross-leak test can be carried out via cumulating the leakage of argon gas or not, but the test gas channel should not be connected to the cryogenic pump; Having the function of using helium gas as tracer gas of fine-leak test, the test gas of fine-leak test can be carried out by cumulating via the cryogenic pump or be carried out without the cryogenic pump and cumulating;

the leak test system is started and working parameters of the leak detector are adjusted, so that the leak detector is warmed and works for a period of time, and a specified verification method is employed to verify that the leak test system is in a stable working state. In the stable working state, the stable background value of argon measured leak rate $R_{Arb}$ of the leak detector during the load-free test should be no larger than ⅓ of the criterion for argon measured leak rate $R_{Ar0max}$ of gross-leak test, and the stable background value of helium leak rate $R_b$ of fine-leak test should be no larger than ⅓ of the criterion for helium measured leak rate $R_{max}$ of fine-leak test;

the system can provided with the relation curve between argon measured leak rate and time for gross-leak test started from flushing during gross-leak test and can determine whether to carry out the cumulative gross-leak test or not, the argon measured leak rate criterion for gross-leak test $R_{Ar0max}$, the minimum gross-leak detection time $t_{4min}$, the maximum gross-leak detection time $t_{4max}$, and gross-leak detection time $t_4$;

the system can provided with the relation curve between helium measured leak rate and time for fine-leak test during fine-leak test and can determine whether to carry out the cumulative fine-leak test or not, the criterion for helium measured leak rate $R_{max}$, the minimum fine-leak detection time $t_{5min}$, the maximum fine-leak detection time $t_{5max}$, and fine-leak detection time $t_5$;

when needed, after stabilizing the system again, the leak test system shall be verified whether it is in a stable working state by employing a specified verification method, and then other component is then detected; and the vacuumed detecting chamber is filled with gas, preferably with a clean nitrogen gas, so as to alleviate the contamination of the helium gas and argon gas in the leak test system.

The component under test should meet the following requirements:

the welding material structure and the surface conditions of the welding seam, the metal, the glass and the ceramic of the component under test should be controlled, and fingerprints, welding flux and organic materials on the surface thereof should be reduced or eliminated, to avoid excessive helium gas and argon gas absorbed on the surface during helium-argon prefilling, argon prefilling, helium-argon pressuring and storing;

measures shall be taken to ensure that no unstable leak aperture or seam and sub-cavity outside a sealing nugget ring exist on the component under test;

the mixed nitrogen-helium-argon or nitrogen-argon gas prefilled and the helium-argon gas pressured when the component under test is sealed should be dry and clean; and after sealing with helium-argon or argon prefilling or helium-argon pressuring, the component under test should be preserved in a dry and clean air environment with a normal helium and argon gas content, without being contaminated, to alleviate the contamination of the helium mass spectrometric leak test system and prevent a leak aperture from being blocked.

During the working process, the following safety regulations shall be followed:

the gas cylinders of the nitrogen gas, the helium gas and the argon gas should conform to the safety laws and standards; the helium-argon pressurizing tank and the connection pipes pass through a strength test in a condition of 1.5 times of the pressure of pressurized gas; the pressure applied should not be higher than the sustainable pressure of a component under test; and the pressurizing and discharging rate of the helium-argon pressurizing tank is controlled, so that both the pressurizing time and the discharging time for reaching a test pressure should be no less than 20 s.

3. Embodiments

Preferred Embodiment 1

The present invention provides a combination test method by using argon as gross-leak tracer gas and using helium as fine-leak tracer gas, which improved the existed test method of cumulative helium mass spectrometric combination test by using argon gas as gross-leak tracer gas and using helium gas as fine-leak tracer gas. The working procedure thereof is as follows.

Step S1 of Selecting:

according to basic criterions—the rigor grade $\tau_{Hemin}$, the helium and argon leak rate range of the Cumulative Helium Leak Detector (CHLD), the helium and argon background leak rate, the history of leak test, cavity volume of the component under test, and the absorbed helium and argon leak rate after its removal, the fixed or flexible scheme of helium-argon prefilling method and helium-argon pressuring method after argon prefilling are selected for the first hermeticity test, flexible scheme of helium-argon pressuring method after helium-argon prefilling or helium-argon multi-pressuring method after argon prefilling is selected for repetitive hermeticity test, and the argon measured leak rate criterion $R_{Ar0max}$ is selected for gross-leak test;

the rigor grade $\tau_{Hemin}$ is specified by the product specifications and the contract. When the hermeticity requirements of the product specifications or the contract is an equivalent standard leak rate criterion $L_{max}$, $\tau_{Hemin}$ is obtained by formula (35). The value of $\tau_{Hemin}$ would be 20 days, 200 days, or 2000 days for the fixed scheme and for the flexible scheme the value can be same as the fixed scheme or be flexibly selected;

for the first test, the helium-argon prefilling method would be generally selected for its high sensitivity and larger range of available $\tau_{Hemin}$ and cavity volume, and it's better to select helium-argon pressuring method after argon prefilling when the component has larger cavity volume and the rigor grade $\tau_{Hemin}$ is lower; excepted some high accurate test for several samples, generally the fixed scheme which is easy to operate but is accompanied with a certain test deviation is selected; the flexible scheme which can be used for more accurate test, but involves flexible and specific design and calculation of the test condition and the criterion for measured leak rate may also be selected as well;

for the repetitive tests, the flexible scheme of helium-argon pressuring method after helium-argon prefilling is selected if the first test used helium-argon prefilling method; and the flexible scheme of helium-argon multi-pressuring method after argon prefilling is selected if the first test used helium-argon pressuring method after argon prefilling;

for the fixed scheme, as shown in Table 1 and Table 2, according to the cavity volume V of a component under test, on a precondition that $R_{Armax}$ is larger than 3 times of the surface absorbed argon leak rate $R_{Ara}$ of the component under test in dry air, $R_{Ar0max}$ is selected as the value of $7.95 \times 10^{-4}$ Pa·cm$^3$/s, $2.39 \times 10^{-3}$ Pa·cm$^3$/s, $7.95 \times 10^{-3}$ Pa·cm$^3$/s or $2.39 \times 10^{-2}$ Pa·cm$^3$/s; For the flexible scheme, according to the absorbed argon leak rate $R_{Ara}$, $R_{Ar0max}$ can be selected from the values above or selected flexibly.

Step S2 of Designing:

according to the test method, the scheme, $\tau_{Hemin}$ and $R_{Ar0max}$ which is selected in step S1, the pressure and time conditions of helium-argon prefilling, argon prefilling, or helium-argon pressuring are designed in step S2.1; the helium measured leak rate criterion $R_{max}$ is designed in step S2.2 and the maximum detection-waiting time $t_{max}$ is designed in step S2.4; the maximum gross-leak detection time $t_{4max}$, the maximum fine-leak detection time $t_{5max}$, and the minimum detection-waiting time $t_{3min}$ of helium-argon prefilling method are designed in step S2.5; and the fixed scheme or flexible scheme is designed in step S2.6;

in step S2.1, the pressure and time conditions of helium-argon prefilling, argon prefilling or helium-argon pressuring are designed:

if the helium-argon prefilling method is selected in the first detection, the total gas pressure P is $(1+10\%)P_0$ during seal, with helium partial pressure $P_{He}$ of $(1+10\%)kP_0$, argon partial pressure $P_{Ar}$ of $(1+10\%)$ $P_{Ar0}$, and the rest of nitrogen, where $P_0$ is standard atmospheric pressure $1.013 \times 10^5$ Pa; k is the helium prefilling ratio $P_{Hed}/P_0$, wherein $P_{Hed}$ is a helium partial pressure of a designed helium-argon prefilling when the total pre-inflation pressure is standard atmospheric pressure; $P_{Ar0}$ is the normal partial pressure of argon in atmosphere;

for the fixed scheme, k=0.21 is chosen; and k is variable from 0.03 to 0.5 for flexible scheme;

if helium-argon pressuring method after argon prefilling is selected for the first detection, the total gas pressure P is $(1+10\%)P_0$ during seal, with argon partial pressure $(1+10\%)$ $P_{Ar0}$ and the rest of nitrogen; the total pressure of bombed gas is no more than $6P_0$, in which there is argon with the partial pressure $P_{Ar}$ equal to $P_{Ar0}$, helium with the partial pressure $P_E$ no less than $2P_0$. The helium-argon pressuring time $t_1$ is long enough to make sure that the helium measured leak rate criterion $R_{1max}$ reaches the detectable range of detectors;

for the repetitive tests, if the helium-argon pressuring method after helium-argon prefilling is selected, in the nth (n is no less than 1) helium-argon pressuring, the argon partial pressure $P_{Ar}$ is $P_{Ar0}$, the helium partial pressure $P_{En}$ is no less than $2P_0$ to prevent the fine-leak detection missing; the helium-argon pressuring time tin can be obtained by formula (1), $$t_{1n} \geq \frac{1}{P_{En}} \left( \frac{1}{10e} kP_0 t_{3.0n} + 0.15 \sum_{i=1}^{n-1} P_{Ei} t_{1i} \right) \quad (1)$$

$$t_{1n} \geq 1.2 \, h$$

where, $t_{3.0n}$ is the interval time from the ending of sealing to the ending of the nth helium-argon pressuring; $P_E$ and $t_{1i}$ are the helium part pressure and time in the ith helium-argon pressuring; and for the repetitive tests, if the helium-argon multi-pressuring method after argon prefilling is selected, in the nth (n is no less than 2) helium-argon pressuring, the argon partial pressure $P_{Ar}$ is $P_{Ar0}$, the helium partial pressure $P_{En}$ is no less than $2P_0$ to prevent the fine-leak detection missing; the helium-argon pressuring time tin is obtained by formula (1) when k=0.

In step S2.2, the helium measured leak rate criterion $R_{max}$ of fine-leak test is designed:

for the helium-argon prefilling method in first test, when the components under detection are stored for the detection-waiting time $t_3$ in the normal atmosphere, the helium measured leak rate criterion $R_{2max}$ of the fine-leak test can be obtained by formula (2), $$R_{2max} = \frac{VkP_0}{\tau_{He\,min}} \exp\left(-\frac{t_3}{\tau_{He\,min}}\right) \quad (2)$$

where V denotes a internal cavity volume of the component under detection;

$R_{2max}$ can be obtained by approximate formula (3) in the condition of $$t_3 \leq \frac{1}{10} \tau_{He\,min},$$

$$R_{2max} = \frac{VkP_0}{\tau_{He\,min}} \quad (3)$$

for the helium-argon pressuring method after argon pre-filling in the first test, the components under detection are stored in air after seal, bombed helium-argon for time $t_1$ and then stored for detection-waiting time $t_2$, the helium measured leak rate criterion $R_{2max}$ of the fine-leak test can be obtained by formula (4), $$R_{1max} = \frac{VP_E}{\tau_{He\,min}} \left[1 - \exp\left(-\frac{t_1}{\tau_{He\,min}}\right)\right] \exp\left(-\frac{t_2}{\tau_{He\,min}}\right) \quad (4)$$

or $R_{1max}$ is obtained by approximate formula (5) in the condition of $$t_1 \leq \frac{1}{5} \tau_{He\,min} \text{ and } t_2 \leq \frac{1}{10} \tau_{He\,min}.$$

$$R_{1max} = \frac{VP_E t_1}{\tau_{He\,min}^2} \quad (5)$$

for the helium-argon pressuring method after helium-argon prefilling in the repetitive tests, the helium measured leak rate criterion $R_{2n.max}$ of fine-leak test after the nth (n is no less than 1) helium-argon pressuring can be obtained by formula (6), $$R_{2n.max} = \frac{V}{\tau_{He\,min}} \quad (6)$$

$$\left\{ kP_0 \exp\left(-\frac{t_{3.0n}}{\tau_{He\,min}}\right) + \sum_{i=1}^{n} P_{Ei} \left[1 - \exp\left(-\frac{t_{1i}}{\tau_{He\,min}}\right)\right] \exp\left(-\frac{t_{2,in}}{\tau_{He\,min}}\right) \right\}$$

$$\exp\left(-\frac{t_{2n}}{\tau_{He\,min}}\right)$$

where $t_{2,in}$ is the interval time from the ending of the ith helium-argon pressuring to the ending of nth helium-argon pressuring;

similarly, $R_{2n.max}$ can be obtained by approximate formula (7) in the condition of $$t_{1i} \leq \frac{1}{5} \tau_{He\,min}, t_{2n} \leq \frac{1}{10} \tau_{He\,min},$$

$$R_{2n.max} = \quad (7)$$

$$\frac{V}{\tau_{He\,min}} \left\{ kP_0 \exp\left(-\frac{t_{3.0n}}{\tau_{He\,min}}\right) + \frac{1}{\tau_{He\,min}} \sum_{i=1}^{n} P_{Ei} t_{1i} \exp\left(-\frac{t_{2,in}}{\tau_{He\,min}}\right) \right\}$$

for the repetitive tests, in the condition of $$t_{3.0n} \leq \frac{1}{10} \tau_{He\,min} \text{ and } t_{2n} \leq \frac{1}{10} \tau_{He\,min},$$

$R_{2n.max}$ can also be obtained by approximate formula (8), $$R_{2n.max} = \frac{V}{\tau_{He\,min}} \left( kP_0 + \frac{1}{\tau_{He\,min}} \sum_{i=1}^{n} P_{Ei} t_{1i} \right) \quad (8)$$

furthermore, when $$\left( \frac{1}{\tau_{He\,min}} \sum_{i=1}^{n} P_{Ei} t_{1i} \right) \leq \frac{1}{10} kP_0$$

in the formula (8), $R_{2n.max}$ can be obtained by formula (9), $$R_{2n.max} = \frac{VkP_0}{\tau_{He\,min}} \quad (9)$$

for the helium-argon multi-pressuring method after argon prefilling in the repetitive tests, the helium measured leak rate criterion $R_{1n.max}$ of fine-leak test after the nth (n is no less than 2) helium-argon pressuring can be obtained by formula (10), $$R_{1n.max} = \frac{V}{\tau_{He\,min}} \left\{ \sum_{i=1}^{n} P_{Ei} \left[1 - \exp\left(-\frac{t_{1i}}{\tau_{He\,min}}\right)\right] \exp\left(-\frac{t_{2.in}}{\tau_{He\,min}}\right) \right\} \exp\left(-\frac{t_{2n}}{\tau_{He\,min}}\right) \quad (10)$$

or, $R_{1n.max}$ can be obtained by approximate formula (11) in the condition of $$t_{1i} \leq \frac{1}{5}\tau_{He\,min}, \; t_{2n} \leq \frac{1}{10}\tau_{He\,min},$$

$$R_{1n.max} = \frac{V}{\tau_{He\,min}^2} \left[ \sum_{i=1}^{n} P_{Ei} t_{1i} \exp\left(-\frac{t_{2.in}}{\tau_{He\,min}}\right) \right] \quad (11)$$

furthermore, when $$t_{2.in} \leq \frac{1}{10}\tau_{He\,min} \text{ and } t_{1i} \leq \frac{1}{10}\tau_{He\,min}$$

in formula (11), $R_{1n.max}$ can be obtained by formula (12).

$$R_{1n.max} = \frac{V}{\tau_{He\,min}^2} \sum_{i=1}^{n} P_{Ei} t_{1i} \quad (12)$$

In step S2.3, the upper limit of the cavity volume can be obtained by formula (13), $$V_{max} = \frac{L_{max0}\tau_{He\,min}}{P_0} \sqrt{\frac{M_A}{M_{He}}} \quad (13)$$

where $L_{max0}$ is the maximum detectable equivalent standard leak rate, $L_{max0}=1.0$ Pa·cm$^3$/s; $M_{He}$ is the molecular weight of helium in grams, $M_{He}=4.003$ g; $M_A$ is the mean molecular weight of air in grams, $M_A=28.96$ g.

In step S2.4, the maximum detection-waiting time $t_{max}$ of fine-leak test is designed:

corresponding to the argon measured leak rate criterion $R_{Ar0max}$ of gross-leak test, $R_{0max}$, which is the helium measured leak rate criterion of gross-leak test when the helium partial pressure $P_{He}$ is equal to $P_{He0}$ in the component under test, can be obtained by formula (14), $$R_{0max} = R_{Ar0max} \frac{P_{He0}}{P_{Ar0}} \sqrt{\frac{M_{Ar}}{M_{He}}} \quad (14)$$

where $P_{He0}$ is the helium partial pressure in normal atmosphere, $P_{He0}=0.533$ Pa; $P_{Ar0}$ is the argon partial pressure in normal atmosphere, $P_{Ar0}=946$ Pa; $M_{Ar}$ is the molecular weight of argon in grams, $M_{Ar}=39.948$ g;

the helium exchange time constant $\tau_{He0}$ of gross-leak can be obtained by formula (15), $$\tau_{He0} = \frac{VP_0}{L_0}\sqrt{\frac{M_{He}}{M_A}} = \frac{VP_{He0}}{R_{0max}} = \frac{VP_{Ar0}}{R_{Ar0max}}\sqrt{\frac{M_{He}}{M_{Ar}}} \quad (15)$$

where $L_0$ is the minimum detectable equivalent standard leak rate of gross-leak, $$L_0 = R_{Ar0max}\frac{P_0}{P_{Ar0}}\sqrt{\frac{M_{Ar}}{M_A}};$$

the argon exchange time constant $\tau_{Ar0}$ of gross-leak can be obtained by formula (16), $$\tau_{Ar0} = \frac{VP_{Ar0}}{R_{Ar0max}} = \tau_{He0}\sqrt{\frac{M_{Ar}}{M_{He}}} \quad (16)$$

the helium exchange time constant $\tau_{He0.m}$ of medium-leak can be obtained by formula (17), $$\tau_{He0.m} = \tau_{He0}\frac{R_{0max}}{R_{max}} \quad (17)$$

where the fine-leak helium measured leak rate criterion $R_{max}$ is less than $R_{0max}$;

for helium-argon prefilling method, when $\tau_{He\,min}>\tau_{He0}$ and $R_{2max} \geq R_{0max}$, the maximum detection-waiting time of fine-leak test or combination test $t_{3max}$ can be obtained by formula (18), $$t_{3max} = \frac{\tau_{He\,min}\tau_{He0}}{\tau_{He\,min}-\tau_{He0}}\ln\left(\frac{\tau_{He\,min}}{\tau_{He0}}\right) = \frac{\tau_{He\,min}VP_{He0}}{\tau_{He\,min}R_{0max}-VP_{He0}}\ln\left(\frac{\tau_{He\,min}R_{0max}}{VP_{He0}}\right) \quad (18)$$

for the fixed scheme, $t_{3max}$ can be obtained by formula (19), $$t_{3max} = \frac{\tau_{He\,min}VP_{He0}}{\tau_{He\,min}R_{0max}-VP_{He0}}\ln\left(\frac{\tau_{He\,min}R_{0max}}{VP_{He0}}\right) \quad (19)$$

$$t_{3max} \leq \frac{1}{10}\tau_{He\,min}$$

for the helium-argon prefilling method, when $\tau_{He\,min}>\tau_{He0}$ and $R_{2max}<R_{0max}$, $t_{3max}$ can be obtained by formula (20), $$t_{3max} = \frac{\tau_{He\,min}\tau_{He0.m}}{\tau_{He\,min}-\tau_{He0.m}}\ln\left(\frac{\tau_{He\,min}}{\tau_{He0.m}}\right) \quad (20)$$

for the fixed scheme, $t_{3max}$ can be obtained by formula (21), $$t_{3max} = \frac{\tau_{Hemin}P_{He0}}{kP_0 - P_{He0}}\ln\left(\frac{kP_0}{P_{He0}}\right) \quad (21)$$

$$t_{3max} \leq \frac{1}{10}\tau_{Hemin}$$

for the helium-argon pressuring method after argon prefilling, when $\tau_{Hemin} > \tau_{He0}$ and $R_{1max} \geq R_{0max}$, the maximum detection-waiting time of fine-leak test $t_{2max}$ can be obtained by formula (22), $$t_{2max} = \frac{\tau_{Hemin}\tau_{He0}}{\tau_{Hemin} - \tau_{He0}}\left\{\ln\left(\frac{\tau_{Hemin}}{\tau_{He0}}\right) + \ln\left[\frac{1-\exp\left(-\frac{t_1}{\tau_{He0}}\right)}{1-\exp\left(-\frac{t_1}{\tau_{Hemin}}\right)}\right]\right\} \quad (22)$$

$$= \frac{\tau_{Hemin}VP_{He0}}{\tau_{Hemin}R_{0max} - VP_{He0}}$$

$$\left\{\ln\left(\frac{\tau_{Hemin}R_{0max}}{VP_{He0}}\right) + \ln\left[\frac{1-\exp\left(-\frac{t_1 R_{0max}}{VP_{He0}}\right)}{1-\exp\left(-\frac{t_1}{\tau_{Hemin}}\right)}\right]\right\}$$

for the fixed scheme, $t_{2max}$ can be obtained by formula (23), $$t_{2max} = \frac{\tau_{Hemin}VP_{He0}}{\tau_{Hemin}R_{0max} - VP_{He0}}\left\{\ln\left(\frac{\tau_{Hemin}R_{0max}}{VP_{He0}}\right) + \ln\left[\frac{1-\exp\left(-\frac{t_1 R_{0max}}{VP_{He0}}\right)}{1-\exp\left(-\frac{t_1}{\tau_{Hemin}}\right)}\right]\right\} \quad (23)$$

$$t_{2max} \leq \frac{1}{10}\tau_{Hemin}$$

for the helium-argon pressuring method after argon prefilling, when $\tau_{Hemin} > \tau_{He0}$, $R_{1max} < R_{0max}$, $t_{2max}$ can be obtained by formula (24), $$t_{2max} = \frac{\tau_{Hemin}\tau_{He0.m}}{\tau_{Hemin} - \tau_{He0.m}}\left\{\ln\left(\frac{\tau_{Hemin}}{\tau_{He0.m}}\right) + \ln\left[\frac{1-\exp\left(-\frac{t_1}{\tau_{He0.m}}\right)}{1-\exp\left(-\frac{t_1}{\tau_{Hemin}}\right)}\right]\right\} \quad (24)$$

for the fixed scheme, $t_{2max}$ can be obtained by formula (25), $$t_{2max} = \frac{\tau_{Hemin}^2 P_{He0}}{P_E t_1 - P_{He0}\tau_{Hemin}}\left\{\ln\left(\frac{P_E t_1}{P_{He0}\tau_{Hemin}}\right) + \ln\left[\frac{1-\exp\left(-\frac{P_E t_1}{P_{He0}\tau_{Hemin}^2}\right)}{1-\exp\left(-\frac{t_1}{\tau_{Hemin}}\right)}\right]\right\} \quad (25)$$

$$t_{2max} \leq \frac{1}{10}\tau_{Hemin}$$

for the helium-argon pressuring method after helium-argon prefilling, after the nth (n is no less than 1) helium-argon pressuring, the maximum detection-waiting time can be obtained by formula (26) when $\tau_{Hemin} > \tau_{He0}$ and $R_{2n.max} \geq R_{0max}$, $$t_{3n.max} = \frac{\tau_{Hemin}\tau_{He0}}{\tau_{Hemin} - \tau_{He0}}\ln\left(\frac{\tau_{Hemin}}{\tau_{He0}}\right) \quad (26)$$

in the condition of $\tau_{Hemin} > \tau_{He0}$ and $R_{2n.max} < R_{0max}$, $t_{3n.max}$ can be obtained by formula (27), $$t_{3n.max} = \frac{\tau_{Hemin}\tau_{He0.m}}{\tau_{Hemin} - \tau_{He0.m}}\ln\left(\frac{\tau_{Hemin}}{\tau_{He0.m}}\right) \quad (27)$$

for the helium-argon multi-pressuring method after argon prefilling, after the nth (n is no less than 2) helium-argon pressuring, the maximum detection-waiting time of fine-leak $t_{2n.max}$ can be obtained by formula (28), when $\tau_{Hemin} > \tau_{He0}$ and $R_{1n.max} \geq R_{0max}$, $$t_{2n.max} = \frac{\tau_{Hemin}\tau_{He0}}{\tau_{Hemin} - \tau_{He0}}\ln\left(\frac{\tau_{Hemin}}{\tau_{He0}}\right) \quad (28)$$

in the condition of $\tau_{Hemin} > \tau_{He0}$ and $R_{1n.max} < R_{0max}$, $t_{2n.max}$ can be obtained by formula (29), $$t_{2n.max} = \frac{\tau_{Hemin}\tau_{He0.m}}{\tau_{Hemin} - \tau_{He0.m}}\ln\left(\frac{\tau_{Hemin}}{\tau_{He0.m}}\right) \quad (29)$$

in order to ensure the feasibility of the tests for numbers of components under test, all the $t_{max}$ above (including $t_{3max}$, $t_{2max}$, $t_{3n.max}$, $t_{2n.max}$) are no less than 0.5 hour.

In step S2.5, in order to reduce or prevent detection missing in gross-leak test and fine-leak test, the parameters including the maximum gross-leak detection time $t_{4max}$, the maximum fine-leak detection time $t_{5max}$ and the minimum detection-waiting time of helium-argon prefilling method $t_{3min}$ are designed:

$t_{4max}$ can be obtained by formula (30) when using one of the four typical hermeticity test methods (including helium-argon prefilling method, helium-argon pressuring method after argon prefilling, helium-argon pressuring method after helium-argon prefilling, and helium-argon multi-pressuring method after argon prefilling), $$t_{4max} = \frac{1}{10}\tau_{Ar0} = \frac{1}{10}\frac{VP_{Ar0}}{R_{Ar0max}} \quad (30)$$

$$30\,s \leq t_{4max} \leq 900\,s$$

for the four typical hermeticity test methods, when the measured leak rate criterion of fine-leak test $R_{max}$ (including $R_{2max}$, $R_{1max}$, $R_{2n.max}$, $R_{1n.max}$) is no less than $0.905R_{0max}$, $t_{5max}$ can be obtained by formula (31), $$t_{5max} = \frac{1}{10}\tau_{He0} = \frac{1}{10}\frac{VP_0}{L_0}\sqrt{\frac{M_{He}}{M_A}} \quad (31)$$

$$60\,s \leq t_{5max} \leq 1200\,s$$

and for helium-argon prefilling method, $t_{3min}$ can be obtained by formula (32), $$\left.\begin{array}{l} t_{3min} = \tau_{He0} \dfrac{1}{1+10 l_{He.n}} \\ t_{3min} \le \dfrac{1}{3} t_{3max} \\ \text{or} \\ t_{3min} \le t_{3max} - 24\,\text{h} \end{array}\right\} \quad (32)$$

where $l_{He.n}$ is the viscous conductance constant corresponding to $L_0$ (Pa·cm³/s), when the pressures of both leak hole ends respectively are $P_0$ and 0, and can be obtained by formula (33), $$l_{He.n} = 0.5 L_0^{0.314} \quad (33)$$

for the four typical hermeticity test methods, when $R_{max}$ is less than $0.905 R_{0max}$, $t_{5max}$ can be obtained by formula (34), $$\left.\begin{array}{l} t_{5max} = \dfrac{V P_{Ar0}}{R_{Ar0max}} \sqrt{\dfrac{M_{He}}{M_{Ar}}} \ln\!\left(\dfrac{R_{0max}}{R_{max}}\right) \\ 60\,\text{s} \le t_{5max} \le 1200\,\text{s} \end{array}\right\} \quad (34)$$

In step S2.6, the fixed scheme or flexible scheme is designed:

according to a certain cavity volume V, the selected $\tau_{Hemin}$ and $R_{Ar0max}$, the flexible scheme can be designed for the combination test by using argon as gross-leak tracer gas and using helium as fine-leak tracer gas.

for the components under detection with acceptable hermeticity rigor grade $\tau_{Hemin}$, the maximum equivalent standard leak rate $L_{max}$ can be obtained by formula (35), $$L_{max} = \dfrac{V P_0}{\tau_{Hemin}} \sqrt{\dfrac{M_{He}}{M_A}} \quad (35)$$

the range of cavity volume V for 0.0006 cm³~200 cm³ is divided into different segments, and then the fixed scheme of the helium-argon prefilling method and helium-argon pressuring method after argon prefilling is designed. In the design, $R_{2max}$ can be obtained by formula (3) and $R_{1max}$ by formula (5); the lower limit of a cavity volume segment will be used when designing $R_{2max}$, $R_{1max}$, $t_{3max}$, $t_{2max}$, $t_{4max}$, $t_{5max}$ and $L_{max}$; similarly, the upper limit of V will be used when designing $t_{3min}$. The fixed scheme of helium-argon prefilling method is shown in table 1 and helium-argon pressuring method after argon prefilling in table 2. Where "/" denotes that the value is not available.

Step 3 of Helium-Argon Prefilling, Argon Prefilling or Helium-Argon Pressuring:

according to step S2 of designing, it is done that sealing with prefilling gas or helium-argon pressuring. The component under test which has not been sealed is placed into the helium-argon prefilling device and then the device is vacuumed to below 10 Pa. Argon gas is bombed to reach the pressure (1+10%)946 Pa, helium gas is bombed to reach the pressure $(9.34 \times 10^{-3}+k)(1+10\%)P_0$, nitrogen gas to the pressure (1+10%) $P_0$, and then the components are sealed; for the fixed scheme of the helium-argon prefilling method, k=21.0%, and for the flexible scheme of the helium-argon prefilling method, the ratio k can be the value in the range of 3%~50%, or preferably the value of 21.0%. For helium-argon pressuring method after argon prefilling, k can be the value zero; k is not deviated by more than +5%. The prefilled gas for the fixed scheme of the helium-argon prefilling method can also employ helium gas accounting for 21% of the total amount added to nitrogen gas produced with pressure swing adsorption method. Nitrogen gas produced with pressure swing adsorption method by removing oxygen, carbon dioxide, hydrogen, vapor and organic gas in air and reserving nitrogen and argon gas in air;

for the helium-argon pressuring of helium-argon pressuring method after argon prefilling, helium-argon pressuring method after helium-argon prefilling, and helium-argon multi-pressuring method after argon prefilling, the component under test should be placed in a helium-argon pressuring tank which is vacuumed to below 10 Pa; Within 2 min, argon gas of $P_{Ar}$=946 Pa is filled into primarily and then helium gas is filled into according to the partial pressure $P_E$ or $P_{E.n}$ of pressured helium gas permitted by S2.1. The total pressure of argon and helium gas is maintained within time of $t_1$ or tin. Wherein, $P_E$ and $P_{E.n}$ are no less than $2P_0$, $P_E$, $P_{E.n}$, $t_1$ and $t_{1n}$ are not deviated by more than +5%; and the pressure $P_{Ar}$ of helium-argon prefilling or argon prefilling, the value of k and time for sealing should be recorded and reserved; the argon partial pressure $P_{Ar}$ and the helium partial pressure $P_E$, $P_{E.n}$, the helium-argon pressuring time $t_1$ and $t_{1n}$ for each helium-argon pressuring, and the ending time of helium-argon pressuring should be recorded and reserved.

TABLE 1

Fixed scheme of helium-argon prefilling method for the cumulative helium mass spectrometric combination test the rigor grade $T_{Hemin}$ = 20 d

| segments of cavity volume V (cm³) | $R_{2max}$ (Pa·cm³/s) | $L_{max}$ (Pa·cm³/s) | \multicolumn{4}{c}{the measured leak rate criterion for gross-leak $R_{ArOmax}$ (Pa·cm³/s)} | | | | | | | | | | | |
|---|---|---|---|---|---|---|---|---|---|---|---|---|---|---|---|---|---|
| | | | 7.95E-4 | | | | 2.39E-3 | | | | 7.95E-3 | | | | 2.39E-2 | | | |
| | | | $t_{3min}$ h | $t_{3max}$ h | $t_{4max}$ s | $t_{5max}$ s | $t_{3min}$ h | $t_{3max}$ h | $t_{4max}$ s | $t_{5max}$ s | $t_{3min}$ h | $t_{3max}$ h | $t_{4max}$ s | $t_{5max}$ s | $t_{3min}$ h | $t_{3max}$ h | $t_{4max}$ s | $t_{5max}$ s |
| 0.002~<0.006 | 2.46E-5 | 4.36E-5 | 1.83E-1 | 1.62E0 | 2.38E2 | 7.53E1 | 1.57E-1 | 1.62E0 | 2.37E2 | 7.53E1 | / | / | / | / | / | / | / | / |
| 0.006~<0.02 | 7.39E-5 | 1.31E-4 | 6.10E-1 | 4.16E0 | 7.14E2 | 2.26E2 | 4.72E-1 | 4.55E0 | 7.92E2 | 2.51E2 | / | / | / | / | / | / | / | / |
| 0.02~<0.06 | 2.46E-4 | 4.36E-4 | 1.83E0 | 1.14E1 | 9.00E2 | 7.53E2 | 1.57E0 | 1.14E1 | 9.00E2 | 7.53E2 | 1.05E-1 | 1.62E0 | 2.37E2 | 7.53E1 | / | / | / | / |
| 0.06~<0.2 | 7.39E-4 | 1.31E-3 | 6.10E0 | 2.75E1 | 9.00E2 | 1.20E3 | 4.72E0 | 2.99E1 | 9.00E2 | 1.20E3 | 3.49E-1 | 4.16E0 | 7.14E2 | 2.26E2 | / | / | / | / |
| 0.2~<0.6 | 2.46E-3 | 4.36E-3 | 1.83E1 | 4.80E1 | / | 1.20E3 | 1.57E1 | 4.80E1 | 9.00E2 | 1.20E3 | 1.05E0 | 1.14E1 | 9.00E2 | 7.53E2 | 8.65E-2 | 1.62E0 | 2.37E2 | 7.53E1 |
| 0.6~<2 | 7.39E-3 | 1.31E-2 | / | / | / | / | / | / | / | / | 3.49E0 | 2.75E1 | 9.00E2 | 1.20E3 | 2.60E-1 | 4.55E0 | 7.92E2 | 2.51E2 |
| 2~<6 | 2.46E-2 | 4.36E-2 | / | / | / | / | / | / | / | / | 1.05E1 | 4.80E1 | 9.00E2 | 1.20E3 | 8.65E-1 | 1.14E1 | 9.00E2 | 7.53E2 | the rigor grade $T_{Hemin}$ = 200 d

| segments of cavity volume V (cm³) | $R_{2max}$ (Pa·cm³/s) | $L_{max}$ (Pa·cm³/s) | \multicolumn{4}{c}{the measured leak rate criterion for gross-leak $R_{ArOmax}$ (Pa·cm³/s)} | | | | | | | | | | | |
|---|---|---|---|---|---|---|---|---|---|---|---|---|---|---|---|---|---|
| | | | 7.95E-4 | | | | 2.39E-3 | | | | 7.95E-3 | | | | 2.39E-2 | | | |
| | | | $t_{3min}$ h | $t_{3max}$ h | $t_{4max}$ s | $t_{5max}$ s | $t_{3min}$ h | $t_{3max}$ h | $t_{4max}$ s | $t_{5max}$ s | $t_{3min}$ h | $t_{3max}$ h | $t_{4max}$ s | $t_{5max}$ s | $t_{3min}$ h | $t_{3max}$ h | $t_{4max}$ s | $t_{5max}$ s |
| 0.002~<0.006 | 2.46E-6 | 4.36E-6 | 1.83E-1 | 2.09E0 | 2.38E2 | 7.53E1 | 1.57E-1 | 2.09E0 | 2.37E2 | 7.53E1 | / | / | / | / | / | / | / | / |
| 0.006~<0.02 | 7.39E-6 | 1.31E-5 | 6.10E-1 | 5.60E0 | 7.14E2 | 2.26E2 | 4.72E-1 | 6.15E0 | 7.92E2 | 2.51E2 | / | / | / | / | / | / | / | / |
| 0.02~<0.06 | 2.46E-5 | 4.36E-5 | 1.83E0 | 1.62E1 | 9.00E2 | 7.53E2 | / | / | / | / | 1.05E-1 | 2.09E0 | 2.38E2 | 7.53E1 | / | / | / | / |

TABLE 1-continued

| | | | Fixed scheme of helium-argon prefilling method for the cumulative helium mass spectrometric combination test | | | | | | | | | | |
|---|---|---|---|---|---|---|---|---|---|---|---|---|---|
| 0.06-<0.2 | 7.39E-5 | 1.31E-4 | 6.10E0 | 4.16E1 | 9.00E2 | 1.20E3 | 1.57E0 | 1.62E1 | 9.00E2 | 7.53E2 | 3.49E-1 | 5.60E0 | 7.14E0 | 2.26E2 | 8.65E-2 | 2.09E0 | 2.37E2 | 7.53E1 |
| 0.2-<0.6 | 2.46E-4 | 4.36E-4 | 1.83E1 | 1.14E1 | 9.00E2 | 1.20E3 | 4.72E0 | 4.55E1 | 9.00E2 | 1.20E3 | 1.05E0 | 1.62E1 | 9.00E2 | 7.53E2 | 2.60E-1 | 6.15E0 | 7.92E2 | 2.51E2 |
| 0.6-<2 | 7.39E-4 | 1.31E-3 | 6.10E1 | 2.75E2 | 9.00E2 | 1.20E3 | 1.57E1 | 1.14E2 | 9.00E2 | 1.20E3 | 3.49E0 | 4.16E1 | 9.00E2 | 1.20E3 | 8.65E-1 | 1.62E1 | 9.00E2 | 7.53E2 |
| 2-<6 | 2.46E-3 | 4.36E-3 | 1.83E2 | 4.80E2 | 9.00E2 | 1.20E3 | 4.72E1 | 2.99E2 | 9.00E2 | 1.20E3 | 1.05E1 | 1.14E2 | 9.00E2 | 1.20E3 | 2.60E0 | 4.55E1 | 9.00E2 | 1.20E3 |
| 6-<20 | 7.39E-3 | 1.31E-2 | / | / | / | / | 1.57E2 | 4.80E2 | 9.00E2 | 1.20E3 | 3.49E1 | 2.75E2 | 9.00E2 | 1.20E3 | 8.65E0 | 1.14E2 | 9.00E2 | 1.20E3 |
| 20-<60 | 2.46E-2 | 4.36E-2 | / | / | / | / | / | / | / | / | 1.05E2 | 4.80E2 | 9.00E2 | 1.20E3 | 2.60E1 | 2.99E2 | 9.00E2 | 1.20E3 |
| 60-<200 | 7.39E-2 | 1.31E-1 | / | / | / | / | / | / | / | / | / | / | / | / | 8.65E1 | 4.80E2 | 9.00E2 | 1.20E3 | segments of cavity volume | | | the rigor grade $T_{Hemin}$ = 2000 d the measured leak rate criterion for gross-leak $R_{ArOmax}$ (Pa · cm$^3$/s)

| V cm$^3$ | $R_{2max}$ Pa · cm$^3$/s | $L_{max}$ Pa · cm$^3$/s | 7.95E-4 | | | | 2.39E-3 | | | | 7.95E-3 | | | | 2.39E-2 | | | |
|---|---|---|---|---|---|---|---|---|---|---|---|---|---|---|---|---|---|---|
| | | | $t_{3min}$ h | $t_{3max}$ h | $t_{4max}$ s | $t_{5max}$ s | $t_{3min}$ h | $t_{3max}$ h | $t_{4max}$ s | $t_{5max}$ s | $t_{3min}$ h | $t_{3max}$ h | $t_{4max}$ s | $t_{5max}$ s | $t_{3min}$ h | $t_{3max}$ h | $t_{4max}$ s | $t_{5max}$ s |
| 0.0006-<0.002 | 7.39E-8 | 1.31E-7 | / | 1.27E1 | 7.14E1 | 6.68E2 | / | / | / | / | / | / | / | / | / | / | / | / |
| 0.002-<0.006 | 2.46E-7 | 4.36E-7 | / | 1.27E1 | 2.38E2 | 1.20E3 | / | / | / | / | / | / | / | / | / | / | / | / |
| 0.006-<0.02 | 7.39E-7 | 1.31E-6 | / | 1.27E1 | 7.14E2 | 1.20E3 | / | 1.27E1 | 7.92E1 | 7.15E2 | / | 1.27E1 | 7.14E1 | 6.68E2 | / | / | / | / |
| 0.02-<0.06 | 2.46E-6 | 4.36E-6 | 1.83E0 | 2.09E1 | 9.00E2 | 1.20E3 | / | 1.27E1 | 2.37E2 | 1.20E3 | / | 1.27E1 | 2.38E2 | 1.20E3 | / | 1.27E1 | 7.92E1 | 7.15E2 |
| 0.06-<0.2 | 6.10E0 | 1.31E-5 | 6.10E0 | 5.60E1 | 9.00E2 | 1.20E3 | 1.57E0 | 1.27E1 | 7.92E2 | 1.20E3 | / | 1.27E1 | 7.14E2 | 1.20E3 | / | 1.27E1 | 2.37E2 | 1.20E3 |
| 0.2-<0.6 | 2.46E-5 | 4.36E-5 | 1.83E1 | 1.62E2 | 9.00E2 | 1.20E3 | 4.72E0 | 2.09E1 | 9.00E2 | 7.53E2 | 1.05E0 | 2.09E1 | 9.00E2 | 7.53E2 | / | 1.27E1 | 7.92E2 | 1.20E3 |
| 0.6-<2 | 7.39E-5 | 1.31E-4 | 6.10E1 | 4.16E2 | 9.00E2 | 1.20E3 | 1.57E1 | 6.15E1 | 9.00E2 | 1.20E3 | 3.49E0 | 5.60E1 | 9.00E2 | 1.20E3 | 8.65E-1 | 2.09E1 | 9.00E2 | 7.53E2 |
| 2-<6 | 2.46E-4 | 4.36E-4 | 1.83E2 | 1.14E3 | 9.00E2 | 1.20E3 | 4.72E1 | 1.62E2 | 9.00E2 | 1.20E3 | 1.05E1 | 1.62E2 | 9.00E2 | 1.20E3 | 2.60E0 | 6.15E1 | 9.00E2 | 1.20E3 |
| 6-<20 | 7.39E-4 | 1.31E-3 | / | / | / | / | 1.57E2 | 4.55E2 | 9.00E2 | 1.20E3 | 3.49E1 | 4.16E2 | 9.00E2 | 1.20E3 | 8.65E0 | 1.62E2 | 9.00E2 | 1.20E3 |
| 20-<60 | 2.46E-3 | 4.36E-3 | / | / | / | / | / | 1.14E3 | 9.00E2 | 1.20E3 | / | 1.14E3 | 9.00E2 | 1.20E3 | 2.60E1 | 4.55E2 | 9.00E2 | 1.20E3 |
| 60-<200 | 7.39E-3 | 1.31E-2 | / | / | / | / | / | / | / | / | / | / | / | / | 8.65E1 | 1.14E3 | 9.00E2 | 1.20E3 |

TABLE 2

Fixed scheme of helium-argon pressuring method after argon prefilling for the cumulative helium mass spectrometric combination test the rigor grade $T_{Hemin}$ = 20 d

| segments of cavity volume V cm³ | Condition of pressuring helium | | | $R_{1max}$ Pa·cm³/s | $L_{max}$ Pa·cm³/s | the measured leak rate criterion for gross-leak $R_{ArOmax}$ (Pa·cm³/s) | | | | | | | | | | |
|---|---|---|---|---|---|---|---|---|---|---|---|---|---|---|---|---|
| | | | | | | 7.95E−4 | | | 2.39E−3 | | | 7.95E−3 | | | 2.39E−2 | |
| | $P_E$ $P_0$ | | $t_1$ h | | | $t_{2max}$ h | $t_{4max}$ s | $t_{5max}$ s | $t_{2max}$ h | $t_{4max}$ s | $t_{5max}$ s | $t_{2max}$ h | $t_{4max}$ s | $t_{5max}$ s | $t_{2max}$ h | $t_{4max}$ s | $t_{5max}$ s |
| 0.002~0.006 | 4 | 4 | 5 40 | 4.89E−6 3.91E−5 | 4.36E−5 | 2.57E0 2.14E0 | 2.38E2 | 7.53E1 | / | / | / | / | / | / | / | / | / |
| 0.006~0.02 | 4 | 4 | 5 40 | 1.47E−5 1.17E−4 | 1.31E−4 | 7.02E0 5.74E0 | 7.14E2 | 2.26E2 | 2.57E0 2.14E0 | 2.37E2 | 7.53E1 | / | / | / | / | / | / |
| 0.02~0.06 | 4 | 4 | 5 40 | 4.89E−5 1.95E−4 | 4.36E−4 | 2.08E1 1.81E1 | 9.00E2 | 7.53E2 | 7.73E0 6.78E0 | 7.92E2 | 2.51E2 | 2.57E0 2.28E0 | 2.38E2 | 7.53E1 | / | / | / |
| 0.06~0.2 | 4 | 4 | 5 10 | 1.47E−4 2.93E−4 | 1.31E−3 | 4.80E1 | 9.00E2 | 1.20E3 | 2.08E1 1.95E1 | 9.00E2 | 7.53E2 | 7.02E0 6.59E0 | 7.14E2 | 2.26E2 | 2.57E0 2.42E0 | 2.37E2 | 7.53E1 |
| 0.2~0.6 | 4 | 4 | 5 10 | 4.89E−4 4.89E−4 | 4.36E−3 | 4.80E1 | 9.00E2 | 1.20E3 | 4.80E1 | 9.00E2 | 1.20E3 | 2.08E1 1.95E1 | 9.00E2 | 7.53E2 | 7.73E0 7.25E0 | 7.92E2 | 2.51E2 |
| 0.6~2 | 2 | 2 | 5 10 | 1.47E−3 1.47E−3 | 1.31E−2 | 4.80E1 | 9.00E2 | 1.20E3 | 4.80E1 | 9.00E2 | 1.20E3 | 4.80E1 | 9.00E2 | 1.20E3 | 2.08E1 1.95E1 | 9.00E2 | 7.53E2 |
| 2~6 | 4 | 4 | 5 5 | 4.89E−3 4.89E−3 | 4.36E−2 | / | / | / | 4.80E1 | 9.00E2 | 1.20E3 | 4.80E1 | 9.00E2 | 1.20E3 | 4.80E1 | 9.00E2 | 1.20E3 |
| 6~20 | 2 | 2 | 2.5 5 | 7.33E−3 7.33E−3 | 1.31E−1 | / | / | / | / | / | / | 4.80E1 | 9.00E2 | 1.20E3 | 4.80E1 | 9.00E2 | 1.20E3 |
| 20~60 | 4 | 4 | 2.5 5 | 2.44E−2 2.44E−2 | 4.36E−1 | / | / | / | / | / | / | / | / | / | 4.80E1 | 9.00E2 | 1.20E3 | the rigor grade $T_{Hemin}$ = 200 d

| segments of cavity volume V cm³ | Condition of pressuring helium | | | $R_{1max}$ Pa·cm³/s | $L_{max}$ Pa·cm³/s | the measured leak rate criterion for gross-leak $R_{ArOmax}$ (Pa·cm³/s) | | | | | | | | |
|---|---|---|---|---|---|---|---|---|---|---|---|---|---|---|
| | | | | | | 7.95E−4 | | | 2.39E−3 | | | 7.95E−3 | | 2.39E−2 |
| | $P_E$ $P_0$ | | $t_1$ h | | | $t_{2max}$ h | $t_{4max}$ s | $t_{5max}$ s | $t_{2max}$ h | $t_{4max}$ s | $t_{5max}$ s | $t_{2max}$ h | $t_{4max}$ s | $t_{5max}$ s |
| 0.0006~0.002 | 4 | 4 | 10 40 | 2.93E−8 1.17E−7 | 1.31E−6 | 4.10E1 1.03E1 | 7.14E1 | 8.77E2 5.64E2 | / | / | / | / | / | / |
| 0.002~0.006 | 4 | 4 | 5 40 | 4.89E−8 3.91E−7 | 4.36E−6 | 7.87E1 1.03E1 | 2.38E2 | 1.20E3 9.72E2 | 7.87E1 1.03E1 | 7.92E1 | 1.12E3 5.98E2 | / | / | / |
| 0.006~0.02 | 4 | 4 | 5 | 1.47E−7 | 1.31E−5 | 7.87E1 | 7.14E1 | 1.20E3 | 7.87E1 | 2.37E2 | 1.20E3 | 7.87E1 | 7.14E1 | 1.03E2 |

TABLE 2-continued

| | | | | | Fixed scheme of helium-argon pressuring method after argon prefilling for the cumulative helium mass spectrometric combination test | | | | | | | | | | | | |
|---|---|---|---|---|---|---|---|---|---|---|---|---|---|---|---|---|---|
| | | | $R_{1max}$ Pa·cm³/s | $L_{max}$ Pa·cm³/s | | | | | | | | | | | | | |
| 0.02~<0.06 | 4 | 40 | 1.17E-6 | 4.36E-7 | 1.03E1 | | 1.03E1 | | 9.71E2 | | 1.03E1 | | 5.64E2 | | | 7.92E1 | 1.12E2 |
| | 4 | 5 | 4.89E-7 | | 7.87E1 | 9.00E2 | 7.87E1 | 7.92E2 | 1.20E3 | | 7.87E1 | 2.38E2 | 1.20E3 | | | | 7.73E2 |
| | 4 | 20 | 1.95E-6 | | 2.76E1 | | 2.05E1 | | | | 2.05E1 | | | | | | 1.20E3 |
| 0.06~<0.2 | 4 | 5 | 1.47E-6 | 1.31E-4 | 8.09E1 | 9.00E2 | 7.87E1 | 9.00E2 | 1.20E3 | | 7.87E1 | 7.14E2 | 1.20E3 | | | 2.37E2 | 1.20E3 |
| | 4 | 2 | 5.86E-6 | | 7.57E1 | | 2.05E1 | | 7.53E2 | | 2.05E1 | | | | | | |
| 0.2~<0.6 | 4 | 5 | 4.89E-6 | 4.36E-6 | 2.25E2 | 9.00E2 | 8.87E1 | 9.00E2 | 1.20E3 | | 7.87E1 | 9.00E2 | 1.20E3 | | | 7.92E2 | 1.20E3 |
| | 4 | 10 | 4.89E-6 | | 2.19E2 | | 8.66E1 | | | | 7.67E1 | | | | | | |
| | 4 | 20 | 1.95E-5 | | 2.19E2 | | 8.33E1 | | | | 2.05E1 | | 7.53E2 | | | 9.00E2 | 1.20E3 |
| | 2 | 40 | 1.95E-5 | | 2.11E2 | | 7.88E1 | | | | 1.95E1 | | | | | | |
| 0.6~<2 | 4 | 5 | 1.47E-5 | 1.31E-3 | 4.80E2 | 9.00E2 | 2.25E2 | 9.00E2 | 1.20E3 | | 8.09E1 | 9.00E2 | 1.20E3 | | | 9.00E2 | 7.53E2 |
| | 2 | 10 | 1.47E-5 | | | | 2.23E2 | | | | 7.88E1 | | | | | | |
| | 4 | 10 | 2.93E-5 | | | | 2.23E2 | | | | 7.89E1 | | | | | | |
| | 2 | 20 | 2.93E-5 | | | | 2.19E2 | | | | 7.57E1 | | | | | | |
| 2~<6 | 4 | 5 | 4.89E-5 | 4.36E-3 | 4.80E2 | 9.00E2 | 2.25E2 | 9.00E2 | 1.20E3 | | 8.87E1 | 9.00E2 | 1.20E3 | | | 9.00E2 | 1.20E3 |
| | 2 | 10 | 4.89E-5 | | | | 2.23E2 | | | | 8.66E1 | | | | | | |
| 6~<20 | 4 | 2.5 | 7.33E-5 | 1.31E-2 | / | / | 4.80E2 | 9.00E2 | 1.20E3 | | 4.80E2 | 9.00E2 | 1.20E3 | | | 9.00E2 | 1.20E3 |
| | 2 | 5 | 7.33E-5 | | | | | | | | | | | | | | |
| 20~<60 | 4 | 2.5 | 2.44E-4 | 4.36E-2 | / | / | / | / | / | | 4.80E2 | 9.00E2 | 1.20E3 | | | 9.00E2 | 1.20E3 |
| | 2 | 5 | 2.44E-4 | | | | | | | | | | | | | | |
| 60~<200 | 4 | 2.5 | 7.33E-4 | 1.31E-1 | / | / | / | / | / | | 4.80E2 | 9.00E2 | 1.20E3 | | | 9.00E2 | 1.20E3 |
| | 2 | 5 | 7.33E-4 | | | | | | | | | | | | | | | the rigor grade $T_{Hemin}$ = 2000 d

| segments of cavity volume | Condition of pressuring helium | | | the measured leak rate criterion for gross-leak $R_{ArOmax}$ (Pa·cm³/s) | | | | | | | | |
|---|---|---|---|---|---|---|---|---|---|---|---|---|
| | | | | 7.95E-4 | | 2.39E-3 | | 7.95E-3 | | 2.39E-2 | | |
| V cm³ | $P_E$ $P_0$ | | $t_1$ h | $t_{2max}$ h | $t_{4max}$ s | $t_{2max}$ h | $t_{4max}$ s | $t_{5max}$ s | $t_{2max}$ h | $t_{4max}$ s | $t_{5max}$ s | |
| 0.002~<0.006 | 5 | 4 | 180 | 1.85E2 | 2.38E2 | 1.85E2 | 7.92E1 | 1.20E3 | / | / | 1.20E3 | |
| 0.006~<0.02 | 5 | 4 | 60 | 5.46E2 | 7.14E2 | 5.46E2 | 2.37E2 | 1.20E3 | 5.46E2 | 7.14E1 | 1.20E3 | |

TABLE 2-continued

Fixed scheme of helium-argon pressuring method after argon prefilling for the cumulative helium mass spectrometric combination test

| Range | | | | | | | | | | | | |
|---|---|---|---|---|---|---|---|---|---|---|---|---|
| 0.02~0.06 | 5 | 20 | 2.43E-8 | 4.36E-6 | 1.44E3 | 9.00E2 | 1.20E3 | 1.44E3 | 7.92E2 | 1.20E3 | 1.44E3 | 7.92E1 | 1.20E3 |
| | 4 | 40 | 3.91E-8 | | 9.60E2 | | | 9.60E2 | | | 9.60E2 | | |
| 0.06~0.2 | 4 | 10 | 2.93E-8 | 1.31E-5 | 3.08E3 | 9.00E2 | 1.20E3 | 3.08E3 | 9.00E2 | 1.20E3 | 3.08E3 | 2.37E2 | 1.20E3 |
| | 4 | 40 | 1.17E-7 | | 9.60E2 | | | 9.60E2 | | | 9.60E2 | | |
| 0.2~0.6 | 4 | 5 | 4.89E-8 | 4.36E-5 | 4.80E3 | 9.00E2 | 1.20E3 | 4.80E3 | 9.00E2 | 1.20E3 | 4.80E3 | 7.92E2 | 1.20E3 |
| | 2 | 10 | 4.89E-8 | | 4.80E3 | | | 4.80E3 | | | 4.80E3 | | |
| | 4 | 20 | 1.95E-7 | | 1.74E3 | | | 1.74E3 | | | 1.74E3 | | |
| | 2 | 40 | 1.95E-7 | | 1.73E3 | | | 1.73E3 | | | 1.73E3 | | |
| 0.6~<2 | 4 | 5 | 1.47E-7 | 1.31E-4 | 4.80E3 | 9.00E2 | 1.20E3 | 4.80E3 | 9.00E2 | 1.20E3 | 4.80E3 | 9.00E2 | 1.20E3 |
| | 2 | 10 | 1.47E-7 | | 4.80E3 | | | 4.80E3 | | | 4.80E3 | | |
| | 4 | 20 | 5.86E-7 | | 1.74E3 | | | 1.74E3 | | | 1.74E3 | | |
| | 2 | 40 | 5.86E-7 | | 1.73E3 | | | 1.73E3 | | | 1.73E3 | | |
| 2~6 | 4 | 5 | 4.89E-7 | 4.36E-4 | 4.80E3 | 9.00E2 | 1.20E3 | 4.80E3 | 9.00E2 | 1.20E3 | 4.80E3 | 9.00E2 | 1.20E3 |
| | 2 | 10 | 4.89E-7 | | 4.80E3 | | | 4.80E3 | | | 4.80E3 | | |
| | 4 | 20 | 9.77E-7 | | 3.08E3 | | | 3.08E3 | | | 3.08E3 | | |
| | 2 | 40 | 9.77E-7 | | 3.08E3 | | | 3.08E3 | | | 3.08E3 | | |
| 6~<20 | 4 | 2.5 | 7.33E-7 | 1.31E-3 | 4.80E3 | / | / | 4.80E3 | 9.00E2 | 1.20E3 | 4.80E3 | 9.00E2 | 1.20E3 |
| | 4 | 10 | 2.93E-6 | | 3.08E2 | | | 3.08E2 | | | 3.08E2 | | |
| | 2 | 20 | 2.93E-6 | | 3.08E2 | | | 3.08E2 | | | 3.08E2 | | |
| 20~60 | 4 | 2.5 | 2.44E-6 | 4.36E-3 | / | / | / | / | / | 1.20E3 | 4.80E3 | 9.00E2 | 1.20E3 |
| | 4 | 10 | 9.77E-6 | | | | | | | | 3.08E2 | | |
| | 2 | 20 | 9.77E-6 | | | | | | | | 3.08E2 | | |
| 60~200 | 4 | 2.5 | 7.33E-6 | 1.31E-2 | / | / | / | / | / | / | 4.80E3 | 9.00E2 | 1.20E3 |
| | 4 | 10 | 2.93E-5 | | | | | | | | 3.08E2 | | |
| | 2 | 20 | 2.93E-5 | | | | | | | | 3.08E2 | | |

Step S4 of Removing the Absorbed Helium-Argon and Keeping Internal $P_{Ar0}$ and $P_{He0}$:

before a combination test, the absorbed helium gas formed on the surface of the component under test during helium-argon prefilling, argon prefilling or helium-argon pressuring should be removed; the absorbed argon gas formed on the surface of the component under test should be removed if the component has been in wet environment; The removal of the absorption should be carried out in a dry environment having normal partial pressure of argon gas and helium gas in air. The removal may be accelerated by blow of dry air but not by heated baking or vacuum.

Any direct or potential damage should not be occurred on the component under test during the removing process; and the time used for the removing process should not exceed generally no longer than (⅔) of the maximum detection-waiting time of fine-leak test $t_{max}$ to guarantee that the combination test of the component under test is completed within the maximum detection-waiting time.

After removing the absorbed helium and argon, the surface absorbed helium of the component under test and the measured leak rate formed by absorbed helium should be verified. The absorbed argon leak rate $R_{Ara}$ of gross-leak test should be no more than ⅓ of the criterion for argon measured leak rate $R_{Ar0max}$. The leak rate of absorbed helium $R_a$ of fine-leak test should be no more than ⅓ of the criterion for helium measured leak rate $R_{max}$. Such verification may be carried out with 3 comparison samples with the same shape and appearance, which have been verified to be sealed components without any leak; the absorption leak rate may be obtained by subtracting the stable background value of the leak detector from the actual tested leak rate.

After helium-argon prefilling, argon prefilling or helium pressuring-argon of a component under test, its internal partial pressure of argon gas should be maintained the same value $P_{Ar0}$, and the helium partial pressure no less than $P_{He0}$. When placed in vacuum (including vacuum test) or in gas lacking the normal partial pressure of argon or helium in the air for a time of a that no more than ⅙$t_{max}$, the component under test is placed in the normal air for a period no less than 3.23a to keep the internal argon partial pressure no less than $0.9P_{Ar0}$ and the internal helium partial pressure no less than $0.9P_{He0}$; and then the argon measured leak rate criterion of gross-leak test should be taken the value as $0.9R_{Ar0max}$, and the helium measured leak rate criterion of fine-leak test as still $R_{max}$.

Step S5 of Calibrating:

the calibrations for the Cumulative Helium Leak Detector of the present invention should be carried out respectively for the argon gas leak rate of gross-leak test and for the helium gas leak rate of fine-leak test and able to effectively cover the ranges of criterions for gross-leak test and fine-leak test. During calibration, the standard leak aperture should be placed in a test chamber or connect to a test chamber, or linked with a test chamber in the shortest distance. The calibration should be carried out at each time when the system is stable after starting the detector or changing the device state (such as changing a test chamber, regenerating the cryogenic pump, and adjusting the valve).

Step S6 of Comparing the Maximum and Minimum Detection-Waiting Time of Fine-Leak Test:

for helium-argon prefilling method, the fine-leak detection-waiting time $t_3$, which is from the ending of sealing to the beginning of the combination test, should be no more than the $t_{3max}$ in step S2.4 of designing; when the measured leak rate criterion of fine-leak test $R_{2max}$ is no less than $0.905R_{0max}$, $t_3$ should be no less than the minimum detection-waiting time $t_{3min}$ in step S2.5 of designing. For helium-argon pressuring method after argon prefilling, helium-argon pressuring method after helium-argon prefilling and helium-argon multi-pressuring method after argon prefilling, the detection-waiting time of fine-leak $t_2$, $t_{3n}$ or $t_{2n}$, which is from the ending of the last helium-argon pressuring to the beginning of the combination test, should be no more than the maximum detection-waiting time $t_{2max}$, $t_{3max}$, or $t_{2n.max}$ in step S2.4 of designing.

When the detection-waiting time $t_3$ is less than $t_{3min}$, the test should be done after the condition satisfying the requirements. When the detection-waiting time does not exceed the maximum detection-waiting time, the test procedure enters step S7; when the detection-waiting time is longer than the maximum detection-waiting time, test is carried out again starting from step S2 of designing, step S3 of helium-argon pressuring, and step S4 of removing absorbed helium-argon.

Step S7 of Gross-Leak Test:

in order to prevent misjudge or detection missing, the gross-leak detection time $t_4$, which is from putting the component under test in the chamber, flushing the detecting chamber, and vacuuming to the beginning of reading the argon measured leak rate of gross-leak test $R_{Ar}$, should be no less than the minimum gross-leak detection time $t_{4min}$ and no more than the time $t_{4max}$ designing in step S2.5. The time $t_{4min}$ is the maximum time that the argon background leak rate $R_{Arb}$ falling to the value of (⅓) $R_{Ar0max}$ when the system is stable and no component under test is placed in the detecting chamber.

For gross-leak test, the argon measured leak rate can be obtained by cumulating the leakage of argon or not, but the leakage gas channel should not connected to the cryogenic pump.

If the measured leak rate $R_{Ar}$ is no less than the criterion $R_{Ar0max}$, the component under test is judged as failed for gross-leak test; if $R_{Ar} < R_{Ar0max}$, the gross-leak test is judged as acceptable, and the component is still placed in the vacuumed detecting chamber and is proceeded with Step S8 of fine-leak test. Once the gross-leak happens, the gross-leak test should be preceded again with empty chamber to make sure the adsorbed argon leak rate $R_{Arb}$ less than ⅓$R_{Ar0max}$ at the time of $t_{4min}$.

The rules of keeping $P_{Ar0}$, $P_{He0}$ and the gross-leak rate criterion in step S4 should be done still when the detection-waiting time does not exceed the maximum detection-waiting time $t_{max}$; the next gross-leak test may be more possible for detection missing, if the component under test placed in the air for less than 3.23 times of the last detection time a between two combination test after sealing or once helium-argon pressuring, or the measured gross-leak test criterion was not $0.9R_{Ar0max}$.

Step S8 of Fine-Leak Test:

according to the property of the cumulative helium mass spectrometric combination leak detector which is employed, when the criterion for measured leak rate for fine-leak is less than a certain value (such as $5 \times 10^{-4}$ Pa·cm³/s or $1 \times 10^{-5}$ Pa·cm³/s), the test gas passes through the cryogenic pump and has a cumulative test; when the criterion for measured leak rate for fine-leak is more than a certain value (such as $5 \times 10^{-4}$ Pa·cm³/s or $1 \times 10^{-4}$ Pa·cm³/s), test gas can either pass though the cryogenic pump or not and can either have a cumulative test or not.

In order to prevent misjudge or detection missing, the fine-leak detection time $t_5$, which is from putting the component under test in the chamber, to flushing the detecting chamber, vacuuming, cumulating helium and reading the number, should be no less than the minimum fine-leak detection time $t_{5min}$ and no more than the time $t_{5max}$ designing in step S2.5. the time $t_{5min}$ is the maximum time that the helium background leak rate $R_b$ falling to the value of (⅓) $R_{max}$ (such as $R_{1max}$, $R_{2max}$, $R_{2n.max}$, or $R_{1n.max}$) when the system is stable and no component under test is placed in the detecting chamber.

If the helium measured leak rate R (such as $R_1$, $R_2$, $R_{2n}$, or $R_{1n}$) is greater than the criterion $R_{max}$, the component under test is judged as failed for fine-leak test; if $R \leq R_{max}$, the fine-leak test is judged as acceptable, and S9 is proceeded.

When the gross-leak components under test can be effectively refused and done the rules of keeping $P_{HeO}$ and criterion in step S4, within the maximum detection-waiting time of fine-leak test, the sequential or multiple fine-leak tests of a component under test are efficient after helium-argon prefilling, or helium-argon pressuring.

Step S9 of Complementally Testing the Bigger Gross-Leak:

to prevent gross-leak detection missing, an effective method such as appearance detecting method is added to detect the bigger gross-leak which may be undetected in step S7 for the component under test which has passed step S7 of gross-leak test and step S8 of fine-leak test, especially with the time $t_{4max}$ designed in step S2.6 less than 900 s. If bigger gross-leak is found to exist in complemented test, the hermeticity of the component under test is judged as failed; else the hermeticity of the component under test is judged as acceptable.

If no effective method is taken for complemented test of bigger gross-leak, the hermeticity of the component under test can also be finally judged as acceptable via S7 and S8, but there exists a certain risk of false test for gross-leak at this time.

Step S10 of Quantitative Detection:

if quantitative detection on $\tau_{He}$ or L of a component under test is needed, in step S1, the detailed test method, the flexible scheme, higher rigor grade $\tau_{Hemin}$ and available lower criterion $R_{ArOmax}$ are required. For the first detection, helium-argon prefilling method or helium-argon pressuring method after argon prefilling is selected; for the repetitive tests, helium-argon pressuring method after helium-argon prefilling or helium-argon multi-pressuring method after argon prefilling is selected.

In the designing of step S2.6, the flexible scheme should be design for a certain cavity volume V, which is including the ratio value of helium-argon prefilling method k=0.21, each helium-argon pressuring time $t_{1i}$<$0.1\tau_{Hemin}$, the maximum detection-waiting time $t_{max}$ ($t_{3max}$, $t_{2max}$, $t_{3n.max}$, or $t_{2n.max}$)<$0.1\tau_{Hemin}$, the helium measured leak rate criterion of fine-leak test $R_{max}$ ($R_{2max}$, $R_{1max}$, $R_{2n.max}$, or $R_{1n.max}$), relative $P_E$ (or $P_{En}$), $t_{4max}$, $t_{5max}$, $t_{3min}$, etc.

In step S8 of fine-leak test, the absorbed helium leak rate $R_a$<$0.1R_{max}$ should be verified by using the same shape samples which has passed the fine-leak test; Then the helium leak rate background $R_b$ when the detecting chamber is load-free is read, and the measured leak rate R ($R_2$, $R_1$, $R_{2n}$, or $R_{1n}$) of fine-leak test of a component under test is read.

For the component under test with acceptable hermeticity $\tau_{Hemin}$, the actual helium measured leak rate R' ($R_2'$, $R_1'$, $R_{2n}'$, or $R_{1n}'$) of a component under test is obtained by formula (36), $$R' = R - R_b \quad (36)$$

where R' comprises the leak rate of absorbed helium of a component under test $R_a$ and each test deviation.

for the accepted component in hermeticity test by using helium-argon prefilling method, the helium gas exchange constant $\tau_{He}$ can be approximately obtained by formula (37) through asymptotic fitting method, $$R_2' = \frac{V}{\tau_{He}} \left[ kP_0 \exp\left(-\frac{t_3}{\tau_{He}}\right) + P_{He0} \right] \quad (37)$$

in the condition of $$t_3 \leq \frac{1}{10} \tau_{Hemin} \text{ and } kP_0 \geq 10 P_{He0},$$

the helium gas exchange constant $\tau_{He}$ can be approximately obtained by formula (38), $$\tau_{He} = \tau_{Hemin} \frac{R_{2max}}{R_2'} \quad (38)$$

for the accepted component in hermeticity test by using helium-argon pressuring method after argon prefilling, the helium gas exchange constant $\tau_{He}$ can be approximately obtained by formula (39) through asymptotic fitting method, $$R_1' = \frac{V}{\tau_{He}} \left\{ P_E \left[1 - \exp\left(-\frac{t_1}{\tau_{He}}\right)\right] \exp\left(-\frac{t_2}{\tau_{He}}\right) + P_{He0} \right\} \quad (39)$$

or it can be obtained by formula (40) in the condition of $t_1 \leq 0.1\tau_{Hemin}$, $t_2 \leq 0.1\tau_{Hemin}$, $P_E t_1/\tau_{He} \geq 10 P_{He0}$, $$\tau_{He} = \tau_{Hemin} \sqrt{\frac{R_{1max}}{R_1'}} \quad (40)$$

for the accepted component in hermeticity test by using helium-argon pressuring method after helium-argon prefilling, $\tau_{He}$ can be approximately obtained by formula (41) through asymptotic fitting method, $$R_{2n}' = \frac{V}{\tau_{He}} \left\{ \left\{ kP_0 \exp\left(-\frac{t_{3,0n}}{\tau_{He}}\right) + \sum_{i=1}^{n} P_{Ei}\left[1 - \exp\left(-\frac{t_{1i}}{\tau_{He}}\right)\right] \exp\left(-\frac{t_{2,in}}{\tau_{He}}\right) \right\} \exp\left(-\frac{t_{2n}}{\tau_{He}}\right) + P_{He0} \right\} \quad (41)$$

for the accepted component in hermeticity test by using helium-argon multi-pressuring method, $\tau_{He}$ can be approximately obtained by formula (42) through asymptotic fitting method, $$R_{1n}' = \frac{V}{\tau_{He}} \left\{ \sum_{i=1}^{n} P_{Ei}\left[1 - \exp\left(-\frac{t_{1i}}{\tau_{He}}\right)\right] \exp\left(-\frac{t_{2,in}}{\tau_{He}}\right) \exp\left(-\frac{t_{2n}}{\tau_{He}}\right) + P_{He0} \right\} \quad (42)$$

then the equivalent standard leak rate L can be obtained by formula (43) when $\tau_{He}$ has been gotten.

$$L = \frac{VP_0}{\tau_{He}} \sqrt{\frac{M_{He}}{M_A}} \quad (43)$$

Both of $\tau_{He}$ and L can be the quantitative detection results with certain detection deviation In this invention of the combination test by using argon as gross-leak tracer gas and using helium as fine-leak tracer gas, the helium-argon pressuring method after argon prefilling and helium-argon multi-pressuring method after argon prefilling is added in optional specific method; and the range of $2.39 \times 10^{-2}$ Pa·cm³/s is added in argon measured leak rate criterion $R_{Ar0max}$ for gross-leak test. Furthermore, a series of methods is provided to reduce and prevent the detection missing and misjudge in fine-leak/gross-leak test, including further quantitative expansion of the maximum detection-waiting time, the improved removal method of absorbed helium-argon, the method to keep the internal partial pressure of helium-argon and to rule corresponding criterion. Besides, this invention provides the methods to quantitatively determine the minimum pressure during pressing helium, the minimum detection-waiting time of helium-argon prefilling method, the maximum and minimum gross-leak detection time, and the maximum and minimum fine-leak detection time. Thereby, the available rigor grade $\tau_{Hemin}$ and the cavity volume V are expanded, and this invention effectively prevents the detection missing and misjudge in gross/fine-leak test. Not only the invention makes the test more applicable and convenient, but also solves the feasibility and credibility problems of the leak test.

Preferred Embodiment 2

The preferred embodiment provides a combination testing method by using argon as gross-leak test tracer gas and using helium as fine-leak test tracer gas. The method comprises at least step S1 of selecting: helium-argon prefilling method is the specific method for the first test, and helium-argon pressuring method after helium-argon prefilling is the specific method for repetitive hermeticity test; or helium-argon pressuring method after argon prefilling is the specific method for the first test, and helium-argon multi-pressuring method after argon prefilling is the specific method for repetitive hermeticity tests. The criterion for gross-leak test is taken as argon measured leak rate $R_{Ar0max}$, and the basic criterion for fine-leak test is taken as rigor grade $\tau_{Hemin}$ and the characterized criterion as helium measured leak rate $R_{max}$. For the first hermeticity test, the fixed scheme or the flexible scheme can be selected, and the flexible scheme should be selected for repetitive tests. For fixed scheme, the rigor grade $\tau_{Hemin}$ can be taken the value as 2000 days, 200 days, 20 days or other values, and the criterion $R_{Ar0max}$ is selected as the value of $7.95 \times 10^{-4}$ Pa·cm³/s, $2.39 \times 10^{-3}$ Pa·cm³/s, $7.95 \times 10^{-3}$ Pa·cm³/s, $2.39 \times 10^{-2}$ Pa·cm³/s or other values. The rigor grade and the criterion for flexible scheme can be taken the same value as the fixed scheme, or other values.

The subsequent steps of the method can be the steps as shown in preferred embodiment 1, or other subsequent steps that can expand the applicable rigor grade and range of cavity volume for the combination test method above mentioned, and can improve the feasibility and credibility of the test.

As known by those skilled in the art, the present invention which has been described with reference to the embodiments can make various changes and equivalent replacements on these characteristics and embodiments without departing from the spirit and scope of the present invention. Additionally, under the guidance of the present invention, these characteristics and embodiments can be modified to be adapted for specific conditions without departing from the spirit and scope of the present invention. For example, the methods, including the method of further quantitatively expanding the maximum detection-waiting time, the way to keep the internal helium/argon partial pressure of the component under test, the method of determining the maximum and minimum detection time, the method of designing the minimum detection-waiting time, the rule of helium pressuring pressure no less than 2 times of $P_0$, the method of quantitative detection, can be exchanged directly or by converting certain conditions to apply for the improvement of a helium mass spectrometric fine-leak test method based on quantitatively determined the maximum detection-waiting time, a helium mass spectrometric fine-leak test method for helium pressuring after helium prefilling or multi-helium pressuring, or a cumulative helium mass spectrometric gross/fine-leak combination test method for the hermeticity test; the method of designing helium measured leak rate criterion for repetitive tests is available for improving the helium mass spectrometric fine-leak test method in the condition of multi-helium pressuring or helium pressuring after helium prefilling; the method of determining the maximum and minimum gross-leak detection time through equaling $R_{Ar0max}$ to $R_{0max}$ can be used to improve a cumulative helium mass spectrometric gross/fine-leak combination test method for the hermeticity test. Accordingly, the present invention is not limited to the specific embodiments disclosed herein and all embodiments which fall within the claims of the present invention belong to the scope protected by the present invention.

What is claimed is:

1. A combination test method by using argon as gross-leak tracer gas and using helium as fine-leak tracer gas, comprising a step S1 of selecting: a helium-argon prefilling method is selected for a first hermeticity test and a helium-argon pressuring method after helium-argon prefilling is selected for repetitive hermeticity test, or a helium-argon pressuring method after argon prefilling is selected for the first hermeticity test and a helium-argon multi-pressuring method after argon prefilling is selected for the repetitive hermeticity test;

wherein a detectable range of cavity volume V, detected by a fixed scheme of the helium-argon prefilling method, of a component under detection is from 0.0006 cm³ to less than 200 cm³ when a rigor grade $\tau_{Hemin}$ of the first hermeticity test is 2000 days; a detectable range of cavity volume V, detected by a fixed scheme of the helium-argon pressuring method after helium-argon prefilling, of the component under detection is from 0.002 cm³ to less than 200 cm³ when the rigor grade $\tau_{Hemin}$ of the first hermeticity test is 2000 days; a detectable range of cavity volume V, detected by a fixed scheme of the helium-argon prefilling method, of the component under detection is from 0.002 cm³ to less than 6 cm³ when the rigor grade $\tau_{Hemin}$ of the first hermeticity test is 20 days; a detectable range of cavity volume V, detected by a fixed scheme of the helium-argon pressuring method after helium-argon prefilling, of the component under detection is from 0.002 cm³ to less than 60 cm³ when the rigor grade $\tau_{Hemin}$ of the first hermeticity test is 20 days; the first hermeticity test comprises one gross-leak test and one fine-leak test, the repetitive hermeticity test also comprises one gross-leak test and one fine-leak test; a argon measured leak rate criterion $R_{Ar0max}$ is taken as a criterion for the gross-leak test, and for fine-leak test, the rigor grade $\tau_{Hemin}$ is taken as a basic criterion and a helium measured leak rate criterion $R_{max}$ of the fine-leak test is taken as a characteristic criterion; and either a fixed scheme or a flexible scheme is taken for the first hermeticity test, and the flexible scheme is taken for the repetitive hermeticity test;

wherein the fixed scheme is a scheme of according to the selected rigor grade $\tau_{Hemin}$, selected method and selected argon measured leak rate criterion $R_{Ar0max}$ of the gross-leak test, setting the cavity volume segments of component under detection, the fixed condition of helium-argon prefilling or helium-argon pressuring after argon prefilling, the helium measured leak rate criterion $R_{max}$ of the fine-leak test, a maximum and minimum detection-waiting time of the fine-leak test, a maximum gross-leak detection time, and a maximum fine-leak detection time;

wherein the flexible scheme is a scheme of according to the selected rigor grade $\tau_{Hemin}$, selected method, selected argon measured leak rate criterion $R_{Ar0max}$ of the gross-leak test, and the cavity volume of the component under detection, setting a fixed ratio of argon gas of the helium-argon prefilling method, the helium-argon prefilling method, or the helium-argon pressuring method, a flexible ratio of helium gas of the helium-argon prefilling method or the helium-argon pressuring method, a flexible value of helium measured leak rate criterion $R_{max}$ of the fine-leak test, the maximum and minimum detection-waiting time of the fine-leak test, the maximum gross-leak detection time, and the maximum fine-leak detection time;

wherein the rigor grade $\tau_{Hemin}$ of the fixed scheme is chosen as 2000 days, 200 days, or 20 days according to a specification or a contract of the component under detection, and on a precondition that $R_{Ar0max}$ is larger than 3 times of a surface absorbed argon leak rate $R_{Ara}$ of the component under detection stored in dry air, the argon measured leak rate criterion $R_{Ar0max}$ of the gross-leak test is chosen as $7.95\times10^{-4}$ Pa·cm³/s, $2.39\times10^{-3}$ Pa·cm³/s, $7.95\times10^{-3}$ Pa·cm³/s or $2.39\times10^{-2}$ Pa·cm³/s, the rigor grade $\tau_{Hemin}$ is a constant of allowable minimum helium gas exchange time for an acceptable component under detection; the rigor grade $\tau_{Hemin}$ of the flexible scheme is same as the fixed scheme or a flexible value, and the argon measured leak rate criterion $R_{Ar0max}$ is same as the fixed scheme or a flexible value;

a step S2 of designing: according to the selected method, scheme, $\tau_{Hemin}$ and $R_{Ar0max}$, pressure and time conditions of helium-argon prefilling, argon prefilling, or helium-argon pressuring are designed; the helium measured leak rate criterion $R_{max}$ of the fine-leak test and the maximum detection-waiting time $t_{max}$ are designed; the maximum gross-leak detection time $t_{4max}$, the maximum fine-leak detection time $t_{5max}$, and the minimum detection-waiting time $t_{3min}$ of helium-argon prefilling method are designed; and the fixed scheme or the flexible scheme is designed, wherein step S2.1, the pressure and time conditions of helium-argon prefilling, argon prefilling or helium-argon pressuring are designed as follows:

if the helium-argon prefilling method is selected for the first hermeticity test, the total gas pressure P is $(1+10\%)P_0$ during the sealing of component under detection, with a first helium partial pressure $P_{He}$ of $(1+10\%)kP_0$, an argon partial pressure $P_{Ar}$ of $(1+10\%)P_{Ar0}$, and the rest of the total gas is nitrogen gas, wherein, $P_0$ is standard atmospheric pressure $1.013\times10^5$ Pa; k is a helium prefilling ratio $P_{Hed}/P_0$, wherein $P_{Hed}$ is a helium partial pressure of a designed helium-argon prefilling when the total gas pressure is standard atmospheric pressure; $P_{Ar0}$ is the normal part pressure of argon in atmosphere, $P_{Ar0}=946$ Pa;

for the fixed scheme, k=0.21 is chosen; and k is a flexible value from 0.03 to 0.5 for flexible scheme;

if helium-argon pressuring method after argon prefilling is selected for the first hermeticity test, the total gas pressure P is $(1+10\%)P_0$ during the sealing of component under detection, with argon partial pressure $(1+10\%)P_{Ar0}$ and the rest of the total gas is nitrogen gas; the bombed gas pressure is no more than $6P_0$, in which there is an argon partial pressure $P_{Ar}$ equal to $P_{Ar0}$, and a second helium partial pressure $P_E$ is no less than $2P_0$, helium-argon pressuring time $t_1$ is long enough to make sure that helium measured leak rate criterion $R_{1max}$ reaches the detectable range of detectors;

for the repetitive hermeticity test, if the helium-argon pressuring method after helium-argon prefilling is selected, in the nth helium-argon pressuring, where the integer n is no less than 1, the argon partial pressure $P_{Ar}$ is $P_{Ar0}$, a third helium partial pressure $P_{En}$ is no less than $2P_0$ to prevent fine-leak detection missing; helium-argon pressuring time $t_{1n}$ is obtained by formula 1, $$t_{1n} \geq \frac{1}{P_{En}}\left(\frac{1}{10e}kP_0 t_{3.0n} + 0.15\sum_{i=1}^{n-1} P_{Ei}t_{1i}\right)$$
$$t_{1n} \geq 1.2 \text{ h}$$

formula 1 wherein, $t_{3.0n}$ is an interval time from the ending of sealing of the component under detection to the ending of the nth helium-argon pressuring; $P_{Ei}$ and $t_{1i}$ are the helium partial pressure and time in the ith helium-argon pressuring; and for the repetitive hermeticity test, if the helium-argon multi-pressuring method after argon prefilling is selected, in the nth helium-argon pressuring, where n is an integer no less than 2, the argon partial pressure $P_{Ar}$ is $P_{Ar0}$, the third helium partial pressure $P_{En}$ is no less than $2P_0$ to prevent the fine-leak detection missing; helium-argon pressuring time $t_{1n}$ is obtained by formula 1 when k=0;

step S2.2, the helium measured leak rate criterion $R_{max}$ of fine-leak test is designed as follows:

for the helium-argon prefilling method in the first hermeticity test, the component under detection is stored for a detection-waiting time $t_3$ in normal atmosphere, helium measured leak rate criterion $R_{2max}$ of the fine-leak test is obtained by formula 2, $$R_{2max} = \frac{VkP_0}{\tau_{Hemin}}\exp\left(-\frac{t_3}{\tau_{Hemin}}\right)$$

formula 2 wherein, V denotes a cavity volume of the component under detection;

$R_{2max}$ is obtained by approximate formula 3 in the condition of $$t_3 \le \frac{1}{10}\tau_{He\,min},$$

$$R_{2max} = \frac{VkP_0}{\tau_{He\,min}} \qquad \text{formula 3}$$

for the helium-argon pressuring method after argon prefilling in the first hermeticity test, the component under detection is stored in air after the sealing of the component under detection, bombed helium-argon for time $t_1$ and then stored for detection-waiting time $t_2$, the helium measured leak rate criterion $R_{2max}$ of the fine-leak test is obtained by formula 4, $$R_{1max} = \frac{VP_E}{\tau_{He\,min}}\left[1 - \exp\left(-\frac{t_1}{\tau_{He\,min}}\right)\right]\exp\left(-\frac{t_2}{\tau_{He\,min}}\right) \qquad \text{formula 4}$$

or $R_{1max}$ is obtained by approximate formula 5 in the condition of $$t_1 \le \frac{1}{5}\tau_{He\,min} \text{ and } t_2 \le \frac{1}{10}\tau_{He\,min},$$

$$R_{1max} = \frac{VP_E t_1}{\tau_{He\,min}^2} \qquad \text{formula 5}$$

for the helium-argon pressuring method after helium-argon prefilling in the repetitive hermeticity test, the helium measured leak rate criterion $R_{2n.max}$ of fine-leak test after the nth, n is no less than 1, helium-argon pressuring is obtained by formula 6, $$R_{2n.max} = \qquad \text{formula 6}$$
$$\frac{V}{\tau_{He\,min}}\left\{kP_0\exp\left(-\frac{t_{3.0n}}{\tau_{He\,min}}\right) + \sum_{i=1}^{n}P_{Ei}\left[1 - \exp\left(-\frac{t_{1i}}{\tau_{He\,min}}\right)\right]\right.$$
$$\left.\exp\left(-\frac{t_{2.in}}{\tau_{He\,min}}\right)\right\}\exp\left(-\frac{t_{2n}}{\tau_{He\,min}}\right)$$

wherein, $t_{2.in}$ is the interval time from the ending of the ith helium-argon pressuring to the ending of nth pressuring;

similarly, $R_{2n.max}$ is obtained by approximate formula 7 in the condition of $$t_{1i} \le \frac{1}{5}\tau_{He\,min}, t_{2n} \le \frac{1}{10}\tau_{He\,min},$$

$$R_{2n.max} = \qquad \text{formula 7}$$
$$\frac{V}{\tau_{He\,min}}\left\{kP_0\exp\left(-\frac{t_{3.0n}}{\tau_{He\,min}}\right) + \frac{1}{\tau_{He\,min}}\sum_{i=1}^{n}P_{Ei}t_{1i}\exp\left(-\frac{t_{2.in}}{\tau_{He\,min}}\right)\right\}$$

for the repetitive hermeticity test, in the condition of $$t_{3.0n} \le \frac{1}{10}\tau_{He\,min} \text{ and } t_{2n} \le \frac{1}{10}\tau_{He\,min},$$

$R_{2n.max}$ is also obtained by approximate formula 8, $$R_{2n.max} = \frac{V}{\tau_{He\,min}}\left(kP_0 + \frac{1}{\tau_{He\,min}}\sum_{i=1}^{n}P_{Ei}t_{1i}\right) \qquad \text{formula 8}$$

furthermore, when $$\left(\frac{1}{\tau_{He\,min}}\sum_{i=1}^{n}P_{Ei}t_{1i}\right) \le \frac{1}{10}kP_0$$

in the formula 8, $R_{2n.max}$ is obtained by formula 9, $$R_{2n.max} = \frac{VkP_0}{\tau_{He\,min}} \qquad \text{formula 9}$$

for the helium-argon multi-pressuring method after argon prefilling in the repetitive hermeticity test, helium measured leak rate criterion $R_{1n.max}$ of fine-leak test after the nth helium-argon pressuring is obtained by formula 10, n is an integer no less than 2, $$R_{1n.max} = \frac{V}{\tau_{He\,min}} \qquad \text{formula 10}$$
$$\left\{\sum_{i=1}^{n}P_{Ei}\left[1 - \exp\left(-\frac{t_{1i}}{\tau_{He\,min}}\right)\right]\exp\left(-\frac{t_{2.in}}{\tau_{He\,min}}\right)\right\}\exp\left(-\frac{t_{2n}}{\tau_{He\,min}}\right)$$

or, $R_{1n.max}$ is obtained by approximate formula 11 in the condition of $$t_{1i} \le \frac{1}{5}\tau_{He\,min}, t_{2n} \le \frac{1}{10}\tau_{He\,min},$$

$$R_{1n.max} = \frac{V}{\tau_{He\,min}^2}\left[\sum_{i=1}^{n}P_{Ei}t_{1i}\exp\left(-\frac{t_{2.in}}{\tau_{He\,min}}\right)\right] \qquad \text{formula 11}$$

furthermore, when $$t_{2.in} \le \frac{1}{10}\tau_{He\,min} \text{ and } t_{1i} \le \frac{1}{10}\tau_{He\,min}$$

in formula 11, $R_{1n.max}$ is obtained by formula 12, $$R_{1n.max} = \frac{V}{\tau_{He\,min}^2} \sum_{i=1}^{n} P_{Ei} t_{1i} \qquad \text{formula 12}$$

step S2.3, the upper limit of the cavity volume is obtained by formula 13, $$V_{max} = \frac{L_{max0} \tau_{He\,min}}{P_0} \sqrt{\frac{M_A}{M_{He}}} \qquad \text{formula 13}$$

wherein, $L_{max0}$ is the maximum detectable equivalent standard leak rate, $L_{max}$=1.0 Pa·cm³/s; $M_{He}$ is the molecular weight of helium in grams, $M_{He}$=4.003 g; $M_A$ is the average molecular weight of air in grams, $M_A$=28.96 g;

step S2.4, the maximum detection-waiting time $t_{max}$ of fine-leak test is designed:
  corresponding to the argon measured leak rate criterion $R_{Ar0max}$ of gross-leak rate test, $R_{0max}$, which is the helium measured leak rate criterion of gross-leak rate test when helium partial pressure equal to $P_{He0}$ in the component under, is obtained by formula 14, $$R_{0max} = R_{Ar0max} \frac{P_{He0}}{P_{Ar0}} \sqrt{\frac{M_{Ar}}{M_{He}}} \qquad \text{formula 14}$$

wherein, $P_{He0}$ is the helium partial pressure in normal atmosphere, $P_{He0}$=0.533 Pa; $M_{Ar}$ is the molecular weight of argon in grams, $M_{Ar}$=39.948 g;

helium exchange time constant $\tau_{He0}$ of gross-leak is obtained by formula 15, $$\tau_{He0} = \frac{VP_0}{L_0} \sqrt{\frac{M_{He}}{M_A}} = \frac{VP_{He0}}{R_{0max}} = \frac{VP_{Ar0}}{R_{Ar0max}} \sqrt{\frac{M_{He}}{M_{Ar}}} \qquad \text{formula 15}$$

wherein, $L_0$ is the minimum detectable equivalent standard leak rate of gross-leak, $$L_0 = R_{Ar0max} \frac{P_0}{P_{Ar0}} \sqrt{\frac{M_{Ar}}{M_A}};$$

argon exchange time constant $\tau_{Ar0}$ of gross-leak is obtained by formula 16, $$\tau_{Ar0} = \frac{VP_{Ar0}}{R_{Ar0max}} = \tau_{He0} \sqrt{\frac{M_{Ar}}{M_{He}}} \qquad \text{formula 16}$$

helium exchange time constant $\tau_{He0.m}$ of medium-leak is obtained by formula 17, $$\tau_{He0.m} = \tau_{He0} \frac{R_{0max}}{R_{max}} \qquad \text{formula 17}$$

wherein, the helium measured leak rate criterion $R_{max}$ of the fine-leak is less than $R_{0max}$;

for helium-argon prefilling method, when $\tau_{Hemin} > \tau_{He0}$ and $R_{2max} \geq R_{0max}$, the maximum detection-waiting time of the fine-leak test or combination test $t_{3max}$ is obtained by formula 18, $$t_{3max} = \frac{\tau_{He\,min} \tau_{He0}}{\tau_{He\,min} - \tau_{He0}} \ln\left(\frac{\tau_{He\,min}}{\tau_{He0}}\right) = \qquad \text{formula 18}$$

$$\frac{\tau_{He\,min} VP_{He0}}{\tau_{He\,min} R_{0max} - VP_{He0}} \ln\left(\frac{\tau_{He\,min} R_{0max}}{VP_{He0}}\right)$$

for the fixed scheme, $t_{3max}$ is obtained by formula 19, $$\left. \begin{array}{l} t_{3max} = \frac{\tau_{He\,min} VP_{He0}}{\tau_{He\,min} R_{0max} - VP_{He0}} \ln\left(\frac{\tau_{He\,min} R_{0max}}{VP_{He0}}\right) \\ t_{3max} \leq \frac{1}{10} \tau_{He\,min} \end{array} \right\} \quad \text{formula 19}$$

for the helium-argon prefilling method, when $\tau_{Hemin} > \tau_{He0}$ and $R_{2max} < R_{0max}$, $t_{3max}$ is obtained by formula 20, $$t_{3max} = \frac{\tau_{He\,min} \tau_{He0.m}}{\tau_{He\,min} - \tau_{He0.m}} \ln\left(\frac{\tau_{He\,min}}{\tau_{He0.m}}\right) \qquad \text{formula 20}$$

for the fixed scheme, $t_{3max}$ is obtained by formula 21, $$\left. \begin{array}{l} t_{3max} = \frac{\tau_{He\,min} P_{He0}}{kP_0 - P_{He0}} \ln\left(\frac{kP_0}{P_{He0}}\right) \\ t_{3max} \leq \frac{1}{10} \tau_{He\,min} \end{array} \right\} \quad \text{formula 21}$$

for the helium-argon pressuring method after argon prefilling, when $\tau_{Hemin} > \tau_{He0}$ and $R_{1max} \geq R_{0max}$, the maximum detection-waiting time $t_{2max}$ of fine-leak test is obtained by formula 22, $$t_{2max} = \frac{\tau_{He\,min} \tau_{He0}}{\tau_{He\,min} - \tau_{He0}} \left\{ \ln\left(\frac{\tau_{He\,min}}{\tau_{He0}}\right) + \ln\left[\frac{1 - \exp\left(-\frac{t_1}{\tau_{He0}}\right)}{1 - \exp\left(-\frac{t_1}{\tau_{He\,min}}\right)}\right] \right\} = \qquad \text{formula 22}$$

$$\frac{\tau_{He\,min} VP_{He0}}{\tau_{He\,min} R_{0max} - VP_{He0}}$$

$$\left\{ \ln\left(\frac{\tau_{He\,min} R_{0max}}{VP_{He0}}\right) + \ln\left[\frac{1 - \exp\left(-\frac{t_1 R_{0max}}{VP_{He0}}\right)}{1 - \exp\left(-\frac{t_1}{\tau_{He\,min}}\right)}\right] \right\}$$

for the fixed scheme, $t_{2max}$ is obtained by formula 23, $$t_{2max} = \frac{\tau_{He\,min} V P_{He0}}{\tau_{He\,min} R_{0max} - V P_{He0}} \left\{ \ln\left(\frac{\tau_{He\,min} R_{0max}}{V P_{He0}}\right) + \ln\left[\frac{1 - \exp\left(-\frac{t_1 R_{0max}}{V P_{He0}}\right)}{1 - \exp\left(-\frac{t_1}{\tau_{He\,min}}\right)}\right] \right\}$$

$$t_{2max} \leq \frac{1}{10} \tau_{He\,min}$$

formula 23 for the helium-argon pressuring method after argon prefilling, when $\tau_{Hemin} > \tau_{He0}$, $R_{1max} < R_{0max}$, $t_{2max}$ is obtained by formula 24, $$t_{2max} = \frac{\tau_{He\,min} \tau_{He0.m}}{\tau_{He\,min} - \tau_{He0.m}} \left\{ \ln\left(\frac{\tau_{He\,min}}{\tau_{He0.m}}\right) + \ln\left[\frac{1 - \exp\left(-\frac{t_1}{\tau_{He0.m}}\right)}{1 - \exp\left(-\frac{t_1}{\tau_{He\,min}}\right)}\right] \right\}$$

formula 24 for the fixed scheme, $t_{2max}$ is obtained by formula 25, $$t_{2max} = \frac{\tau_{He\,min}^2 P_{He0}}{P_E t_1 - P_{He0} \tau_{He\,min}} \left\{ \ln\left(\frac{P_E t_1}{P_{He0} \tau_{He\,min}}\right) + \ln\left[\frac{1 - \exp\left(-\frac{P_E t_1^2}{P_{He0} \tau_{He\,min}^2}\right)}{1 - \exp\left(-\frac{t_1}{\tau_{He\,min}}\right)}\right] \right\}$$

$$t_{2max} \leq \frac{1}{10} \tau_{He\,min}$$

formula 25 for the helium-argon pressuring method after argon prefilling, after the nth helium-argon pressuring, n is no less than 1, the maximum detection-waiting time is obtained by formula 26 when $\tau_{Hemin} > \tau_{He0}$ and $R_{2n.max} \geq R_{0max}$, $$t_{3n.max} = \frac{\tau_{He\,min} \tau_{He0}}{\tau_{He\,min} - \tau_{He0}} \ln\left(\frac{\tau_{He\,min}}{\tau_{He0}}\right)$$

formula 26 in the condition of $\tau_{Hemin} > \tau_{He0}$ and $R_{2n.max} < R_{0max}$, $t_{3n.max}$ is obtained by formula 27, $$t_{3n.max} = \frac{\tau_{He\,min} \tau_{He0.m}}{\tau_{He\,min} - \tau_{He0.m}} \ln\left(\frac{\tau_{He\,min}}{\tau_{He0.m}}\right)$$

formula 27 for the helium-argon pressuring method after argon prefilling, after the nth helium-argon pressuring, where n is an integer no less than 2, maximum detection-waiting time $t_{2n.max}$ of fine-leak is obtained by formula 28 when $\tau_{Hemin} > \tau_{He0}$ and $R_{1n.max} \geq R_{0max}$, $$t_{2n.max} = \frac{\tau_{He\,min} \tau_{He0}}{\tau_{He\,min} - \tau_{He0}} \ln\left(\frac{\tau_{He\,min}}{\tau_{He0}}\right)$$

formula 28 in the condition of $\tau_{Hemin} > \tau_{He0}$ and $R_{1n.max} < R_{0max}$, $t_{2n.max}$ is obtained by formula 29, $$t_{2n.max} = \frac{\tau_{He\,min} \tau_{He0.m}}{\tau_{He\,min} - \tau_{He0.m}} \ln\left(\frac{\tau_{He\,min}}{\tau_{He0.m}}\right)$$

formula 29 all the $t_{max}$ are no less than 0.5 hour; $t_{max}$ comprises $t_{3max}$, $t_{2max}$, $t_{3n.max}$, and $t_{2n.max}$, step S2.5, in order to reduce or prevent detection missing in gross-leak test and fine-leak test, maximum gross-leak detection time $t_{4max}$, fine-leak detection time $t_{5max}$ and minimum detection-waiting time of helium-argon prefilling method $t_{3min}$ are designed as follows:

$t_{4max}$ is obtained by formula 30 when using one of the following four typical hermeticity test methods, which comprise helium-argon prefilling method, helium-argon pressuring method after argon prefilling, helium-argon pressuring method after helium-argon prefilling, and helium-argon multi-pressuring method after argon prefilling, $$t_{4max} = \frac{1}{10} \tau_{Ar0} = \frac{1}{10} \frac{V P_{Ar0}}{R_{Ar0max}}$$

$$30s \leq t_{4max} \leq 900 \text{ s}$$

formula 30 for the four typical hermeticity test methods, when the measured leak rate criterion $R_{max}$ of the fine-leak test is no less than $0.905 R_{0max}$, $R_{max}$ is obtained by formula 31, $R_{max}$ comprises $R_{2max}$, $R_{1max}$, $R_{2n.max}$ and $R_{1n.max}$, $$t_{5max} = \frac{1}{10} \tau_{He0} = \frac{1}{10} \frac{V P_0}{L_0} \sqrt{\frac{M_{He}}{M_A}}$$

$$60s \leq t_{5max} \leq 1200 \text{ s}$$

formula 31 and for helium-argon prefilling method, $t_{3min}$ is obtained by formula 32, $$t_{3min} = \tau_{He0} \frac{1}{1 + 10 l_{He.n}}$$

$$t_{3min} \leq \frac{1}{3} t_{3max}$$

or $$t_{3min} \leq t_{3max} - 24h$$

formula 32 wherein, $l_{He.n}$ is the viscous conductance constant corresponding to $L_0$ when the pressures of both leak hole ends respectively are $P_0$ and 0, and is obtained by formula 33, $$l_{He.n} = 0.5 L_0^{0.314}$$

formula 33 for the four typical hermeticity test methods, when $R_{max}$ is less than $0.905 R_{0max}$, $t_{5max}$ is obtained by formula 34;

$$t_{5max} = \frac{VP_{Ar0}}{R_{Ar0max}} \sqrt{\frac{M_{He}}{M_{Ar}}} \ln\left(\frac{R_{0max}}{R_{max}}\right) \right\} \quad \text{formula 34}$$

$$60s \leq t_{5max} \leq 1200 \text{ s}$$

step S2.6, the fixed scheme or flexible scheme is designed as follows:

according to a certain cavity volume V, the selected $\tau_{Hemin}$ and $R_{Ar0max}$, the flexible scheme is designed for the combination test with argon as gross-leak tracer gas and helium as fine-leak tracer gas;

for the component under detection with acceptable hermeticity rigor grade $\tau_{Hemin}$, maximum equivalent standard leak rate $L_{max}$ is obtained by formula 35, $$L_{max} = \frac{VP_0}{\tau_{Hemin}} \sqrt{\frac{M_{He}}{M_A}} \quad \text{formula 35}$$

the range of cavity volume V for 0.0006 cm³~200 cm³ is divided into different segments, and then the fixed scheme of the helium-argon prefilling method and helium-argon pressuring method after argon prefilling is designed, $R_{2max}$ is obtained by formula 3 and $R_{1max}$ by formula 5; the lower limit of a cavity volume segment will be used when designing $R_{2max}$, $R_{1max}$, $t_{3max}$, $t_{2max}$, $t_{4max}$, $t_{5max}$ and $L_{max}$; similarly, the upper limit of V will be used when designing $t_{3min}$;

a step S3 of helium-argon prefilling or argon prefilling during sealing of the component under detection and helium-argon pressuring, wherein for the helium-argon prefilling method and helium-argon pressuring method after argon prefilling, the total pressure of prefilling gas P is (1+10%)P₀ with the argon partial pressure of (1+10%)946 Pa and the helium partial pressure as follows: for helium-argon prefilling method, the helium pressure ratio k will be 21% in fixed scheme, or designed by step S2 in flexible scheme, wherein there is no helium in the prefilling gas for helium-argon pressuring method after argon prefilling; and for the fixed scheme and flexible scheme of helium-argon pressuring method after helium-argon prefilling, the flexible scheme of helium-argon pressuring method after argon prefilling and helium-argon multi-pressuring method after argon prefilling, the argon pressure in helium-argon pressuring gas is (1+10%)946 Pa, and $P_E$, and $P_{En}$ are no less than $2P_0$;

a step S4 of removing the absorbed helium-argon and keeping the argon partial pressure $P_{Ar0}$ and the helium partial pressure $P_{He0}$ in normal atmosphere of the internal of the component under detection, wherein the component under detection after sealing or helium-argon pressuring is kept in normal dry air environment with normal argon and helium partial pressure; and the component under detection is stayed in normal air for 3.23 Δt at least to make the argon partial pressure of the component under detection get back to no less than 0.9 $P_{Ar0}$ and the helium partial pressure get back to no less than 0.9$P_{He0}$ if they experienced vacuum baking or testing in the environment without normal helium and argon for Δt, Δt is no longer than $\frac{1}{6}t_{max}$;

the argon leak rate criterion change into $0.9R_{Ar0max}$ for gross-leak test and the helium leak rate criterion is still $R_{max}$ for fine-leak test;

a step S6 of comparing the maximum detection-waiting time of the fine-leak test and minimum detection-waiting time of the fine-leak test, wherein for helium-argon prefilling method, fine-leak test detection-waiting time $t_3$, which is from the ending of the sealing of the component under detection and to the beginning of fine-leak test, is no longer than $t_{3max}$ designed in step S2.4; when the fine-leak measured leak rate $R_{2max} \geq 0.905R_{0max}$, $t_3$ is no less than $t_{3min}$ designed in step S2.5; and for the helium-argon pressuring method after argon prefilling, the helium pressuring method after helium-argon prefilling and helium-argon multi-pressuring method after argon prefilling, the maximum detection-waiting time $t_2$, $t_{3n}$ and $t_{2n}$ from the ending of the last helium-argon pressuring to the beginning of the combination test are respectively no more than $t_{2max}$, $t_{3n.max}$, $t_{2n.max}$ designed in step S2.4; if $t_3>t_{3max}$, $t_2>t_{2max}$, $t_{3n}>t_{3n.max}$ or $t_{2n}>t_{2n.max}$, the component under detection is pressured helium-argon and experienced removing absorbed helium-argon again before test;

a step S7 of performing the gross-leak test, wherein gross-leak detection time $t_4$, which is a time period from putting the component under detection in a detecting chamber, flushing and vacuuming the detecting chamber to the beginning of reading the argon measured leak rate $R_{Ar}$ of the gross-leak test, is no less than minimum gross-leak detection time $t_{4min}$ and no longer than $t_{4max}$ designed in step S2.5; $t_{4min}$ is the longest time of background argon leak rate reducing to ⅓$R_{Ar0max}$ in the condition of stable test system and empty chamber; and if the argon measured leak rate $R_{Ar}$ is no less than $R_{Ar0max}$, the component is refused; if the argon measured leak rate $R_{Ar}$ is less than $R_{Ar0max}$, the component is accepted and the fine-leak test of the component under detection is proceeded;

a step S8 of performing the fine-leak test, wherein fine-leak detection time $t_5$, which is a time period from putting the component under detection in the detecting chamber to the beginning of reading the argon measured leak rate R of the fine-leak test, is no less than the minimum fine-leak detection time $t_{5min}$ and no longer than $t_{5max}$ designed in step S2.5; $t_{5min}$ is the longest time of background helium leak rate $R_b$ reducing to ⅓$R_{max}$ in the condition of stable test system and empty chamber; $R_{max}$ comprises $R_{2max}$, $R_{1max}$, $R_{2n.max}$ or $R_{1n.max}$, and if the measured helium leak rate R is higher than $R_{max}$, R is $R_2$, $R_1$, $R_{2n}$, or $R_{1n}$, the component under detection is refused, else the component under detection is accepted.

2. The combination test method according to claim 1, further comprising a step S10 of the quantitative detection, wherein if quantitative detection $\tau_{He}$ or L of is required, the method, flexible scheme, higher $\tau_{Hemin}$ and available lower $R_{Ar0max}$ are selected in step S1; helium-argon prefilling method or helium-argon pressuring method after argon prefilling is selected for the first hermeticity test, then helium-argon pressuring method after helium-argon prefilling or helium-argon multi-pressuring method after argon prefilling is selected for the repetitive hermeticity test;

according to a certain cavity volume V, the flexible scheme is designed in step S2.6; wherein, for helium-argon prefilling method, k=0.21, every time the helium-argon pressuring time $t_{1i}$ and the maximum detection-waiting time $t_{max}$, is shorter than $0.1\tau_{Hemin}$, $t_{max}$ comprises $t_{3max}$, $t_{2max}$, $t_{3n.max}$, or $t_{2n.max}$, the helium measured leak rate criterion $R_{max}$ is given, $R_{max}$ comprises $R_{2max}$, $R_{1max}$, $R_{2n.max}$, or $R_{1n.max}$, so as to the relative test condition of $P_E$ or $P_{En}$, $t_{4max}$, $t_{5max}$, $t_{3min}$;

in step S8 of fine-leak test, some sample with same shape, which has been detected and accepted, is used to prove absorbed helium leak rate $R_a<0.1R_{max}$, the background helium measured leak rate $R_b$ is read when the detecting chamber is empty, and the helium measured leak rate R of the component under detection is read, which R comprises $R_2$, $R_1$, $R_{2n}$, or $R_{1n}$;

for the accepted component in the condition of $\tau_{He} \geq \tau_{Hemin}$, the real helium measured leak rate R' is obtained by formula 36, R' comprises $R_2'$, $R_1'$, $R_{2n}'$, or $R_{1n}'$, $$R' = R - R_b \qquad \text{formula 36}$$

wherein, R' contains absorbed helium leak rate and other system deviation, for the accepted component in hermeticity test by using helium-argon prefilling method, the helium gas exchange constant $\tau_{He}$ is approximately obtained by formula 37 through asymptotic fitting method, $$R_2' = \frac{V}{\tau_{He}}\left[kP_0 \exp\left(-\frac{t_3}{\tau_{He}}\right) + P_{He0}\right] \qquad \text{formula 37}$$

in the condition of $$t_3 \leq \frac{1}{10}\tau_{Hemin}$$

and $kP_0 \geq 10P_{He0}$, the gas exchange constant $\tau_{He}$ is approximately obtained by formula 38, $$\tau_{He} = \tau_{Hemin}\frac{R_{2max}}{R_2'} \qquad \text{formula 38}$$

for the accepted component in hermeticity test by using helium-argon pressuring method after argon prefilling, the gas exchange constant $\tau_{He}$ is approximately obtained by formula 39 through asymptotic fitting method, $$R_1' = \frac{V}{\tau_{He}}\left\{P_E\left[1 - \exp\left(-\frac{t_1}{\tau_{He}}\right)\right]\exp\left(-\frac{t_2}{\tau_{He}}\right) + P_{He0}\right\} \qquad \text{formula 39}$$

or it is obtained by formula 40 in the condition of $$t_1 \leq \frac{1}{10}\tau_{Hemin},\ t_2 \leq \frac{1}{10}\tau_{Hemin},\ P_E t_1/T_{He} \geq 10P_{He0},$$

$$\tau_{He} = \tau_{Hemin}\sqrt{\frac{R_{1max}}{R_1'}} \qquad \text{formula 40}$$

for the accepted component in hermeticity test by using helium-argon pressuring method after helium-argon prefilling, $\tau_{He}$ is approximately obtained by formula 41 through asymptotic fitting method, $$R_{2n}' = \frac{V}{\tau_{He}} \qquad \text{formula 41}$$

$$\left\{\left\{kP_0 \exp\left(-\frac{t_{3.0n}}{\tau_{He}}\right) + \sum_{i=1}^{n} P_{Ei}\left[1 - \exp\left(-\frac{t_{1i}}{\tau_{He}}\right)\right]\exp\left(-\frac{t_{2.in}}{\tau_{He}}\right)\right\}\right.$$
$$\left.\exp\left(-\frac{t_{2n}}{\tau_{He}}\right) + P_{He0}\right\}$$

for the accepted component in hermeticity test by using helium-argon multi-pressuring method after argon prefilling, $\tau_{He}$ is approximately obtained by formula 42 through asymptotic fitting method, $$R_{1n}' = \qquad \text{formula 42}$$
$$\frac{V}{\tau_{He}}\left\{\sum_{i=1}^{n} P_{Ei}\left[1 - \exp\left(-\frac{t_{1i}}{\tau_{He}}\right)\right]\exp\left(-\frac{t_{2.in}}{\tau_{He}}\right)\exp\left(-\frac{t_{2n}}{\tau_{He}}\right) + P_{He0}\right\}$$

then the equivalent standard leak rate L is obtained by formula 43 when $\tau_{He}$ has been gotten, $$L = \frac{VP_0}{\tau_{He}}\sqrt{\frac{M_{He}}{M_A}} \qquad \text{formula 43}$$

both of $\tau_{He}$ and L are the quantitative detection results with detection deviation.

* * * * *

UNITED STATES PATENT AND TRADEMARK OFFICE
CERTIFICATE OF CORRECTION

PATENT NO. : 10,254,192 B2
APPLICATION NO. : 14/971623
DATED : April 9, 2019
INVENTOR(S) : Genglin Wang, Ningbo Li and Lijun Dong Page 1 of 1

It is certified that error appears in the above-identified patent and that said Letters Patent is hereby corrected as shown below:

In the Claims

In Column 53, Claim 2, please change Line 22 and 23 to:

obtained by formula 36, $R'$ comprises $R'_2, R'_1, R'_{2n},$ or $R'_{1n}$,

Signed and Sealed this
Sixteenth Day of July, 2019

Andrei Iancu
*Director of the United States Patent and Trademark Office*